(12) United States Patent
Ko et al.

(10) Patent No.: US 9,952,363 B2
(45) Date of Patent: Apr. 24, 2018

(54) RANDOM DISPERSION-TYPE REFLECTION POLARIZER

(71) Applicant: TORAY CHEMICAL KOREA INC., Gyeongsangbuk-do (KR)

(72) Inventors: Sueng Jin Ko, Gyeongsangbuk-do (KR); Duk Jae Cho, Gyeongsangbuk-do (KR); Hwang Kyu Lee, Gyeongsangbuk-do (KR)

(73) Assignee: Toray Korea Chemical, Inc. (KR)

( * ) Notice: Subject to any disclaimer, the term of this patent is extended or adjusted under 35 U.S.C. 154(b) by 0 days.

(21) Appl. No.: 15/107,752

(22) PCT Filed: Dec. 30, 2014

(86) PCT No.: PCT/KR2014/013030
§ 371 (c)(1),
(2) Date: Jun. 23, 2016

(87) PCT Pub. No.: WO2015/102364
PCT Pub. Date: Jul. 9, 2015

(65) Prior Publication Data
US 2016/0320537 A1    Nov. 3, 2016

(30) Foreign Application Priority Data

Dec. 31, 2013  (KR) .................. 10-2013-0169215
Dec. 31, 2013  (KR) .................. 10-2013-0169217

(51) Int. Cl.
*G02B 5/30*        (2006.01)
*G02F 1/1335*      (2006.01)
(Continued)

(52) U.S. Cl.
CPC ...... *G02B 5/3008* (2013.01); *B29D 11/00278* (2013.01); *B29D 11/00644* (2013.01);
(Continued)

(58) Field of Classification Search
CPC .. G02B 5/3008; G02B 5/0284; G02B 5/0294; G02B 5/305; G02B 5/3083; G02B 27/283; B29D 11/00278; G02F 1/133528
(Continued)

(56) References Cited

U.S. PATENT DOCUMENTS 5,783,120 A * 7/1998 Ouderkirk ................ G02B 1/04
                                                    264/1.34
5,825,543 A * 10/1998 Ouderkirk ............ G02B 5/3008
                                                    252/585
(Continued)

FOREIGN PATENT DOCUMENTS

JP    2009 282 211    12/2009
KR  10 2002 0077 399  10/2002
(Continued)

*Primary Examiner* — Frank Font
(74) *Attorney, Agent, or Firm* — Emerson Thomson Bennett LLC; Daniel A. Thomson

(57) ABSTRACT

A reflection-type polarizer according to the present invention has an improved bright line visibility phenomenon and a wider viewing angle, compared with a conventional dispersion-type reflection polarizer, and can maximize luminance improvement while minimizing optical loss. In addition, in connection with implementing a reflection polarizer, a group dispersion body can be formed through simple control, making it possible to maximize productivity improvement through process simplification.

12 Claims, 20 Drawing Sheets

(51) Int. Cl.
 *G02B 27/28* (2006.01)
 *B29D 11/00* (2006.01)
 *G02B 5/02* (2006.01)
(52) U.S. Cl.
 CPC ......... G02B 5/0294 (2013.01); G02B 5/3083 (2013.01); G02B 27/283 (2013.01); G02F 1/133528 (2013.01); G02F 1/133536 (2013.01); *G02B 5/0215* (2013.01); *G02B 5/0221* (2013.01); *G02B 5/0231* (2013.01)
(58) Field of Classification Search
 USPC ............ 359/486.01, 489.01, 489.06; 349/96, 349/117, 118
 See application file for complete search history.

(56) References Cited

U.S. PATENT DOCUMENTS

| | | | | |
|---|---|---|---|---|
| 5,867,316 A * | 2/1999 | Carlson | ................ | G02B 5/3008 359/487.02 |
| 6,005,713 A * | 12/1999 | Carlson | ................ | G02B 5/3008 252/585 |
| 6,256,146 B1 * | 7/2001 | Merrill | ................ | G02B 5/3008 252/585 |
| 6,590,705 B1 * | 7/2003 | Allen | ....................... | G02B 1/04 252/585 |
| 6,760,157 B1 * | 7/2004 | Stover | ................ | G02B 5/3008 359/487.02 |
| 2003/0081313 A1 * | 5/2003 | Hiraishi | ............... | G02B 5/0242 359/485.01 |
| 2003/0137633 A1 * | 7/2003 | Ito | ........................ | G02B 5/3008 349/194 |
| 2006/0226562 A1 * | 10/2006 | Johnson | ................... | B29C 55/04 264/1.34 |
| 2006/0228092 A1 * | 10/2006 | Hebrink | ................... | B32B 3/26 385/147 |
| 2013/0094088 A1 * | 4/2013 | Merrill | ................ | B42D 25/387 359/599 |
| 2017/0227699 A1 * | 8/2017 | Stover | ................ | G02B 5/3083 |

FOREIGN PATENT DOCUMENTS

| | | |
|---|---|---|
| KR | 10 2003 0001 295 | 1/2003 |
| KR | 10 2008 0056 687 | 6/2008 |
| WO | 2013 100 661 | 7/2013 |

\* cited by examiner

RANDOM DISPERSION-TYPE REFLECTION POLARIZER

TECHNICAL FIELD

The present invention relates to a random dispersion-type reflective polarizer, and more particularly, to a random dispersion-type reflective polarizer which can minimize optical loss and maximize luminance improvement.

BACKGROUND ART

Flat panel display technology mainly features a liquid crystal display (LCD), a projection display and a plasma display panel (PDP), which have captured the market in the field of TVs, and with the improvement in related technology, a field emission display (FED), an electroluminescent display (ELD), etc. are expected to occupy fields per characteristic. Today, the range of LCDs has expanded into a notebook, a personal computer monitor, a liquid crystal TV, an automobile, an airplane, etc., and LCDs account for approximately 80% of the flat panel market, and are globally booming currently because of a rapid increase in demand.

In a conventional LCD, liquid crystals and an electrode matrix are placed between a pair of absorptive optical films. In the LCD, the liquid crystal part is moved by an electrical field generated by applying a voltage to two electrodes, and has an optical state changed thereby. Such treatment enables "pixels" carrying information to display an image using polarized light in a specific direction. Because of this, the LCD includes a top-side optical film and a bottom-side optical film, inducing polarization.

In an optical film used in the LCD, efficiency of light utilization emitted from a backlight is not necessarily high. This is because 50% or more of light emitted from the backlight is absorbed by a bottom-side optical film (absorptive polarizing film). Therefore, to increase the light-use efficiency of the backlight in the LCD, a reflective polarizer is installed between an optical cavity and a liquid crystal assembly.

FIG. 1 is a diagram illustrating an optical principle of a conventional reflective polarizer. In detail, p-polarized light of light moving from an optical cavity to a liquid crystal assembly is set to be transferred to the liquid crystal assembly by passing through a reflective polarizer, and s-polarized light emitted from a reflective polarizer is reflected to the optical cavity, reflected on a diffusing reflective surface of the optical cavity while polarization direction of light is randomized, and then is sent back to the reflective polarizer, resulting in conversion into the p-polarized light that can pass through the polarizer of the liquid crystal assembly. Then, the p-polarized light is transferred to the liquid crystal assembly through the reflective polarizer.

Selective reflection of the s-polarized light and transmission of the p-polarized light for incident light of the reflective polarizer are achieved by a difference in refractive index between optical layers while one planar optical layer having an anisotropic refractive index and the other planar optical layer having an isotropic refractive index are mutually and alternately stacked, setting of optical thicknesses of the optical layers according to elongation of the stacked optical layers, and a change in refractive indexes of the optical layers.

That is, as light incident to the reflective polarizer passes through the optical layers, the reflection of the s-polarized light and the transmission of the p-polarized light are repeated, and therefore only the p-polarized light of the incident polarized light is transferred to the liquid crystal assembly. Meanwhile, the reflected s-polarized light is, as described above, reflected while a polarization state is randomized at the diffusing reflective surface of the optical cavity, and then is sent back to the reflective polarizer. Therefore, power waste as well as the loss of light generated from a light source may be reduced.

However, since such a conventional reflective polarizer was manufactured to have an optical thickness and a refractive index between the optical layers that enabled optimization for the selective reflection and transmission of the incident polarized light by alternately stacking planar isotropic optical layer and anisotropic optical layer, which had different refractive indexes, and elongating these optical layers, a process of manufacturing the reflective polarizer was complicated. Specifically, since, due to the planar structure of the optical layer of the reflective polarizer, the p-polarized light had to be separated from the s-polarized light, corresponding to a wide range of an incidence angle of the incident polarized light, the number of stacked optical layers was increased so much that a production cost was exponentially increased. Also, because of a structure in which the optical layers are excessively stacked, optical performance was degraded by optical loss.

FIG. 2 is a cross-sectional view of a conventional multilayer reflective polarizer (DBEF). In detail, the multilayer reflective polarizer has skin layers 9 and 10, which are formed on both surfaces of a base 8. The base 8 is divided into four groups 1, 2, 3 and 4, each group including approximately 200 layers by alternately stacking isotropic layers and anisotropic layers. Meanwhile, separate adhesive layers 5, 6 and 7 are formed between the four groups 1, 2, 3 and 4 forming the base 8 to bond them. Also, since each group has a very small thickness of more or less 200 layers, when these groups are individually coextruded, the groups may be damaged, and therefore probably have a protective layer (PBL) in many cases. In this case, the base became thicker, and a production cost was increased. Also, since a reflective polarizer included in a display panel has a limited base thickness for slimming, when an adhesive layer is formed on a base and/or a skin layer, the base is reduced by the thickness of the adhesive layer, and therefore there was a serious problem for improvement of optical properties. Furthermore, since the inside of the base, the base and the skin layer are bonded by the adhesive layer, an interlayer peeling phenomenon may be generated by an external force, long periods of time elapsed or a poor storage area. There also was a problem of an excessively high defect rate in the attachment of the adhesive layer, and destructive interference to a light source due to the formation of the adhesive layer.

When the skin layers 9 and 10 are formed on both surfaces of the base 8, separate adhesive layers 11 and 12 are formed between the base 8 and the skin layers 9 and 10 to bond them. When a conventional polycarbonate-based skin layer is integrated with a PEN-coPEN alternately-stacked base by coextrusion, peeling may occur due to the loss of compatibility, the risk of birefringence with respect to an elongation axis in an elongation process is high since a crystallization degree is within 15%. Accordingly, to apply a polycarbonate sheet for a non-elongation process, an adhesive layer had to be formed. As a result, due to the additional adhesive layer process, a yield is reduced by external impurities and process defects, and usually, to produce a non-elongated polycarbonate sheet of the skin layer, birefringence is caused by non-uniform shear stress generated in a winding process. For this reason, separate controls such as transformation of the molecular structure of a polymer and control of the velocity of an extrusion line are required, and thus productivity is degraded.

Simply describing a method of manufacturing the conventional multilayer reflective polarizer, four groups having different average optical thicknesses enabling formation of the base are separately coextruded, subjected to elongation, and bonded with an adhesive, resulting in manufacturing a base. This is because peeling is generated by elongating the base after the bonding with the adhesive. Afterward, a skin layer is bonded to both surfaces of the base. To form a multilayer structure, one group (209 layers) has to be formed in a process of forming a multilayer structure including forming a tetralayer structure by folding a bilayer structure, continuously folding the structure, and coextruding the resultant structure. Therefore, it was difficult to form a group in the multilayer structure using one process without a thickness change. As a result, after separate coextrusion, the four groups having different average optical thicknesses had to be bonded.

Since the above-described process was intermittently performed, it led to a considerable increase in production costs, and thus among all of the optical films included in a backlight unit, the resultant multilayer polarizer had the highest cost. Therefore, for the sake of cost reduction, there were serious problems of frequently introducing an LCD excluding a reflective polarizer even when the reduction in luminance was ensured.

Therefore, a reflective polarizer, not a multilayer reflective polarizer, in which dispersed bodies capable of achieving the function of a reflective polymerizer, by aligning birefringent polymers elongated in a lengthwise direction in a base, are dispersed has been suggested. FIG. 3 is a perspective view of a reflective polarizer 20 including rod-shaped polymers, in which birefringent polymers 22 elongated in a lengthwise direction in a base 21 are aligned in one direction. Accordingly, a light modulating effect is caused at a birefringent interface between the base 21 and a birefringent polymer 22 to perform the function of the reflective polarizer. However, compared with the above-described alternately-stacked reflective polarizer, it was difficult to reflect light over the entire visible wavelength range, and thus light modulation efficiency was overly decreased. Thus, to have transmittance and reflectivity similar to those of the alternately-stacked reflective polarizer, an excessive number of birefringent polymers 22 had to be disposed in the base. In detail, to manufacture a 32-inch wide display panel based on the vertical cross-section of the reflective polarizer, at least $1 \times 10^8$ round or elliptical birefringent polymers 22 having the lengthwise cross-sectional diameter of 0.1 to 0.3 μm have to be included in a base 21 having a width of 1580 mm and a height (thickness) of 400 μm or less to have optical properties similar to those of the above-described stack-type reflective polarizer. In this case, there were difficult problems in which the reflective polarizer had an excessive production cost and was manufactured by overly complicated equipment in a production facility, thus making it nearly impossible to be commercialized. Also, since it is difficult to form a birefringent polymer 22 included in the sheet with various optical thicknesses, it is difficult to reflect light over the entire visible range, and thus physical properties are degraded.

To overcome these obstacles, a technical idea including a base having a birefringent islands-in-the-sea fiber has been suggested. FIG. 4 is a cross-sectional view of the birefringent islands-in-the-sea fiber included in the base. Since the birefringent islands-in-the-sea fiber may have a light modulating effect generated at a light modulating interface between an island and a sea therein, even though a very large number of islands-in-the-sea fibers are not disposed, like the above-described birefringent polymer, optical properties may be achieved. However, the birefringent islands-in-the-sea fibers are fibers, and thus have problems of compatibility, handleability and cohesion with the base, which is a polymer. Further, as reflective polarization efficiency for an optical wavelength in the visible range is reduced by induction of light scattering because of a round shape, compared with the conventional products, the reflective polarizer has poor polarization characteristics and thus has a limitation in luminance improvement. In addition, in the islands-in-the-sea fibers, since pores were generated by the reduction of an island coupling phenomenon and the subdivision of a sea component region, the optical characteristics were degraded due to light leakage, that is, optical loss. Also, an organizational form of the fabric had a limitation in improvement in reflection and polarization characteristics because of the limitation of a layered configuration. Moreover, a dispersion-type reflective polarizer had a problem of bright line visibility because of the gap between layers and the space between dispersed bodies.

DISCLOSURE

Technical Problem

The present invention is directed to providing a random dispersion-type reflective polarizer which is reduced in the bright line visibility phenomenon, has a wide viewing angle, enables to minimize optical loss and maximize luminance improvement, compared with a conventional dispersion-type reflective polarizer.

Technical Solution

In one aspect, the present invention provides a random dispersion-type reflective polarizer, including: a core layer which, to transmit first polarized light emitted from the outside and reflect second polarized light, includes a plurality of dispersed bodies in a base, the plurality of dispersed bodies having a different refractive index in at least one axis direction in the base, and 80% or more of the dispersed bodies in the base having an aspect ratio, indicating a ratio of the length of the minor axis to the length of the major axis, based on a vertical cross-section in the lengthwise direction of 1/2 or less, where the dispersed bodies having an aspect ratio of 1/2 or less are divided into three or more groups having different cross-sectional areas, the cross-sectional area of the first group is 0.2 to 2.0 $\mu m^2$, the cross-sectional area of the second group is more than 2.0 to 5.0 $\mu m^2$, and the cross-sectional area of the third group is more than 5.0 to 10.0 $\mu m^2$, and the first to third groups of dispersed bodies are randomly aligned.

Preferably, the random dispersion-type reflective polarizer further includes a skin layer integrated on at least one surface of the core layer.

According to an exemplary embodiment of the present invention, among the dispersed bodies having an aspect ratio of 1/2 or less, the number of the dispersed bodies of the third group may be 10% or more.

According to another exemplary embodiment of the present invention, among the dispersed bodies having an aspect ratio of 1/2 or less, the number of the dispersed bodies of the first group may be 30 to 50%, and the number of the dispersed bodies of the third group may be 10 to 30%, and preferably, the number of the dispersed bodies of the first group divided by the number of the dispersed bodies of the third group may be 3 to 5.

According to still another exemplary embodiment of the present invention, among the dispersed bodies having an aspect ratio of 1/2 or less, the number of the dispersed bodies of the second group may be 25 to 45%.

According to yet another exemplary embodiment of the present invention, the difference in refractive index between the base and a dispersed body may be 0.05 or less with respect to two axis directions, and 0.1 or more with respect to the remaining axis direction.

According to yet another exemplary embodiment of the present invention, the reflective polarizer may be elongated in at least one axis direction.

According to yet another exemplary embodiment of the present invention, the reflective polarizer may include a structured surface layer, which is formed on at least one surface of the base.

According to yet another exemplary embodiment of the present invention, a primer layer for reinforcing an adhesive strength may be further included between the base and the structured surface layer.

According to yet another exemplary embodiment of the present invention, the structured surface layer may be a micropattern layer.

According to yet another exemplary embodiment of the present invention, the micropattern may be one or more selected from the group consisting of a prism pattern, a lenticular pattern, a microlens pattern, a triangular pyramid pattern, and a pyramid pattern.

In another aspect, the present invention provides a method of manufacturing a random dispersion-type reflective polarizer, including (1) a core layer which, to transmit first polarized light emitted from the outside and reflect second polarized light, includes a plurality of dispersed bodies in a base, the plurality of dispersed bodies having a different refractive index in at least one axis direction in the base, and 80% or more of the dispersed bodies in the base having an aspect ratio, indicating a ratio of the length of the minor axis to the length of the major axis, based on a vertical cross-section in the lengthwise direction of 1/2 or less, where the dispersed bodies having an aspect ratio of 1/2 or less are divided into three or more groups having different cross-sectional areas, the cross-sectional area of the first group is 0.2 to 2.0 µm², the cross-sectional area of the second group is more than 2.0 to 5.0 µm², and the cross-sectional area of the third group is more than 5.0 to 10.0 µm², and the first to third groups of dispersed bodies are randomly aligned.

According to another exemplary embodiment of the present invention, the method may further include manufacturing a skin layer integrally formed on at least one surface of the core layer.

According to still another exemplary embodiment of the present invention, the method may further include, after the step (1), in the step (2), forming a structured surface layer on at least one surface of the base.

According to yet another exemplary embodiment of the present invention, between the step (1) and the step (2), the method may further include forming a primer layer for reinforcing an adhesive strength between the base and the structured surface layer.

According to yet another exemplary embodiment of the present invention, the structured surface layer may be a micropattern layer, and preferably, the micropattern is one or more selected from the group consisting of a prism pattern, a lenticular pattern, a microlens pattern, a triangular pyramid pattern, and a pyramid pattern.

According to yet another exemplary embodiment of the present invention, in the step (2), the structured surface layer may be formed using a mold film for patterning.

According to yet another exemplary embodiment of the present invention, the step (2) may include: a) transferring the reflective polarizer; b) transferring the mold film for patterning having one surface on which a reverse pattern of the structured surface layer is formed; c) contacting the patterned surface of the mold film for patterning with the reflective polarizer; d) injecting a flowable material into the region in which the reflective polarizer is in contact with the mold film for patterning to fill a space between the patterns; e) curing the material filled between the patterns to apply the material to the reflective polarizer; and f) separating from the mold film for patterning from the reflective polarizer coated with the material, wherein the steps a) and b) may be performed in any order.

According to yet another exemplary embodiment of the present invention, between the step d) and the step e), the method may further include uniformly filling the space between the patterns with the material by applying pressure to the skin layer and the mold film, which are in contact with each other.

According to yet another exemplary embodiment of the present invention, in the step e), the method may include applying heat or UV rays to the material filled between the patterns.

According to yet another exemplary embodiment of the present invention, the step (2) may include: 2-1) transferring a reflective polarizer to be in contact with a master roll having one surface on which a reverse pattern of the structured surface layer is formed, and applying a melted polymer resin to the patterned surface of the master roll or the core layer; and 2-2) curing the polymer resin by UV rays or heat while the polymer resin is pressure-molded on the patterned surface of the master roll and separating the molded polymer resin.

According to yet another exemplary embodiment of the present invention, after the step 2-2), the polymer resin may be secondarily cured by applying UV rays or heat again.

According to another exemplary embodiment of the present invention, the base may be one or more of polyethylenenaphthalate (PEN), copolyethylenenaphthalate (co-PEN), polyethyleneterephthalate (PET), polycarbonate (PC), a PC alloy, polystyrene (PS), heat-resistant polystyrene (PS), polymethylmethacrylate (PMMA), polybutylene terephthalate (PBT), polypropylene (PP), polyethylene (PE), acrylonitrilebutadienestyrene (ABS), polyurethane (PU), polyimide (PI), polyvinylchloride (PVC), a styrene-acrylonitrile (SAN) copolymer, ethylene vinyl acetate (EVA), polyamide (PA), polyacetal (POM), phenol, epoxy (EP), urea (UF), melanin (MF), unsaturated polyester (UP), silicone (SI), elastomer and a cyclo-olefin polymer.

According to still another exemplary embodiment of the present invention, the dispersed body may be one or more of polyethylenenaphthalate (PEN), copolyethylenenaphthalate (co-PEN), polyethyleneterephthalate (PET), polycarbonate (PC), a PC alloy, polystyrene (PS), heat-resistant polystyrene (PS), polymethylmethacrylate (PMMA), polybutylene terephthalate (PBT), polypropylene (PP), polyethylene (PE), acrylonitrilebutadienestyrene (ABS), polyurethane (PU), polyimide (PI), polyvinylchloride (PVC), a styrene-acrylonitrile (SAN) copolymer, ethylene vinyl acetate (EVA), polyamide (PA), polyacetal (POM), phenol, epoxy (EP), urea (UF), melanin (MF), unsaturated polyester (UP), silicone (SI), elastomer and a cyclo-olefin polymer.

According to yet another exemplary embodiment of the present invention, in the difference in refractive index between the base and a dispersed body, the difference in refractive index with respect to the elongated axis direction may be larger than the difference in refractive index with respect to the other axis directions.

According to yet another exemplary embodiment of the present invention, the base and the dispersed body may have a difference in refractive index of 0.05 or less with respect to two axis directions, and 0.1 or more with respect to the remaining axis direction.

According to yet another exemplary embodiment of the present invention, the dispersed body may be elongated in the lengthwise direction.

According to yet another exemplary embodiment of the present invention, a birefringent interface may be formed between a dispersed body and the base.

According to yet another exemplary embodiment of the present invention, the dispersed body may have an optical birefringent property, and the base may be optically isotropic.

Hereinafter, terms used herein will be briefly described.

The sentence "the dispersed bodies have a birefringent property" refers to the fact that when a fiber with different refractive index depending on directions is irradiated with light, the light incident to the dispersed bodies is refracted into two or more types of light in different directions.

The term "isotropic" refers to the fact that, when light passes through a material, a refractive index is uniform regardless of a direction.

The term "anisotropic" refers to the fact that the optical property of a material is changed according to the direction of light, and therefore an anisotropic material has a birefringent property, and is contrary to isotropic.

The term "light modulation" refers to the fact that irradiated light is reflected, refracted, scattered, or changed in intensity, frequency or property of light.

The term "aspect ratio" refers to a ratio of the length of the minor axis to the length of the major axis based on a vertical cross-section in the lengthwise direction of the dispersed body.

Advantageous Effects

A reflective polarizer of the present invention can be reduced in bright line visibility phenomenon, have a wide viewing angle, minimize optical loss and maximize luminance improvement, compared with a conventional dispersion-type reflective polarizer.

Also, in realization of the reflective polarizer, a group of dispersed bodies can be formed through simple control, and maximize productivity improvement by a simple process.

MODES OF THE INVENTION

Hereinafter, the present invention will be described in detail with reference to the accompanying drawings.

A random dispersion-type reflective polarizer of the present invention may include a core layer including, to transmit first polarized light emitted from the outside and reflect second polarized light, a plurality of dispersed bodies in a base, the plurality of dispersed bodies having a different refractive index in at least one axis direction in the base, and 80% or more of the dispersed bodies in the base having an aspect ratio, indicating a ratio of the length of the minor axis to the length of the major axis, based on a vertical cross-section in the lengthwise direction of 1/2 or less, where the dispersed bodies having an aspect ratio of 1/2 or less are divided into three or more groups having different cross-sectional areas, the cross-sectional area of the first group is 0.2 to 2.0 $\mu m^2$, the cross-sectional area of the second group is more than 2.0 to 5.0 $\mu m^2$, and the cross-sectional area of the third group is more than 5.0 to 10.0 $\mu m^2$, and the first to third groups of dispersed bodies are randomly aligned. Therefore, compared with the conventional dispersion-type reflective polarizer, the random dispersion-type reflective polarizer may be improved in the bright light visibility phenomenon, have a wide viewing angle, minimize optical loss, and maximize luminance improvement.

Figure 1:
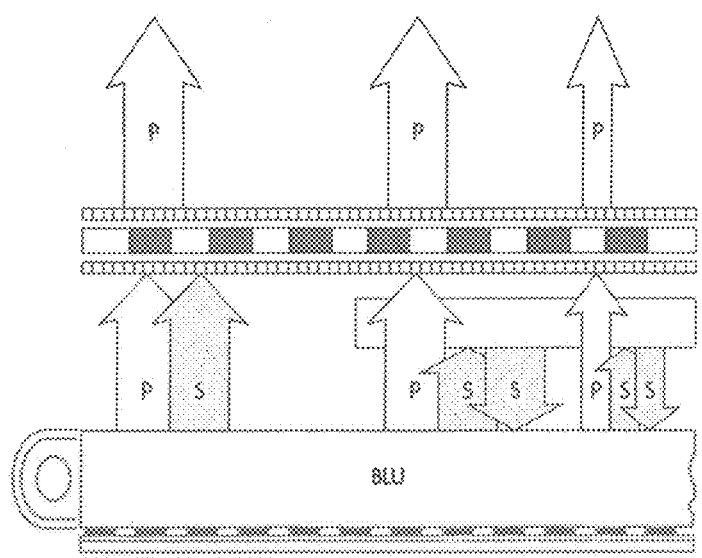
FIG. 1 is a schematic diagram illustrating the principle of a conventional reflective polarizer.
Figure 2:
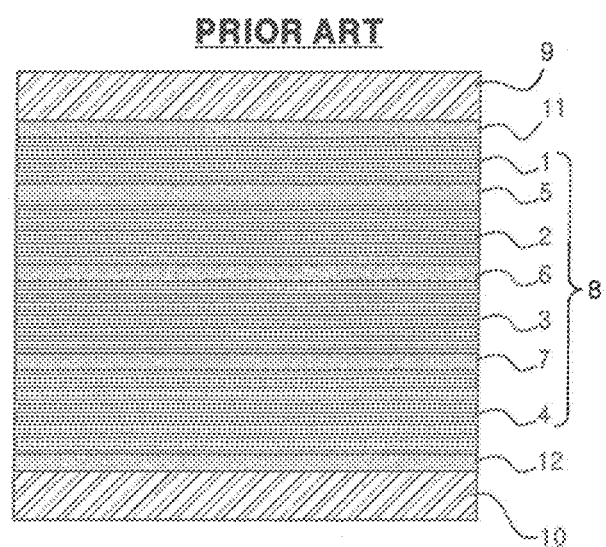
FIG. 2 is a cross-sectional view of a multilayer reflective polarizer (DBEF), which is currently used.
Figure 3:
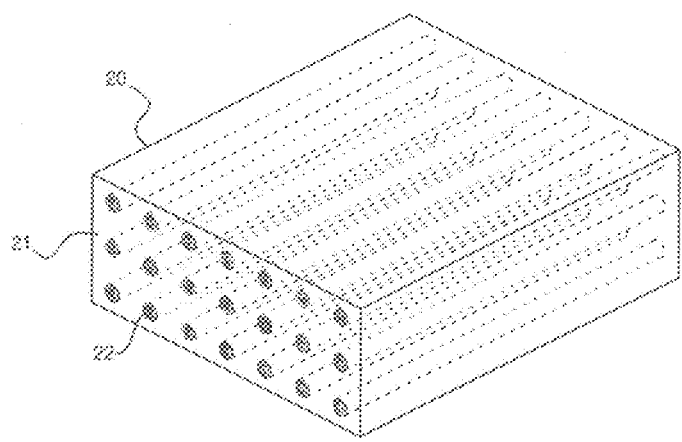
FIG. 3 is a perspective view of a reflective polarizer including a rod-shaped polymer.
Figure 4:
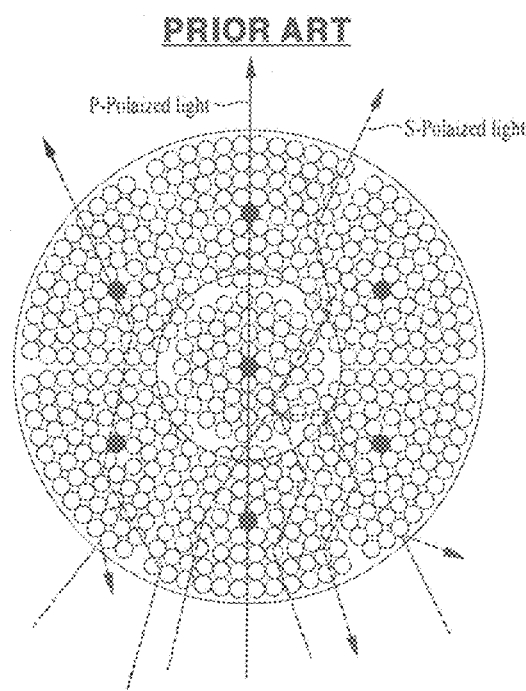
FIG. 4 is a cross-sectional view illustrating the pathway of light incident to a birefringent islands-in-the-sea fiber, which is used in a reflective polarizer.
Figure 5:
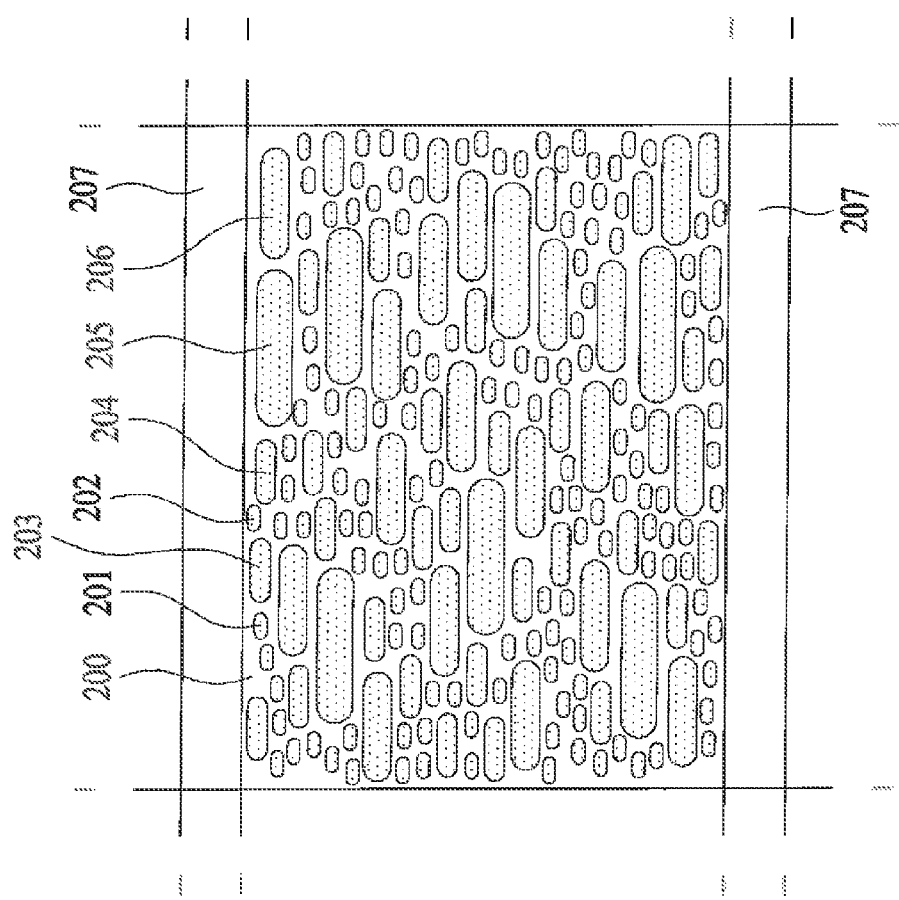
FIG. 5 is a cross-sectional view of a random-type reflective polarizer according to an exemplary embodiment of the present invention.

FIG. 5 is a cross-sectional view of a reflective polarizer in which dispersed bodies are randomly dispersed in a base according to an exemplary embodiment of the present invention. In detail, the reflective polarizer may include a core layer (including 200, 201 to 206) in which a plurality of dispersed bodies 201 to 206 are randomly dispersed in a base 200, and may further include a skin layer 207 integrally formed on at least one surface of the core layer.

Figure 7:
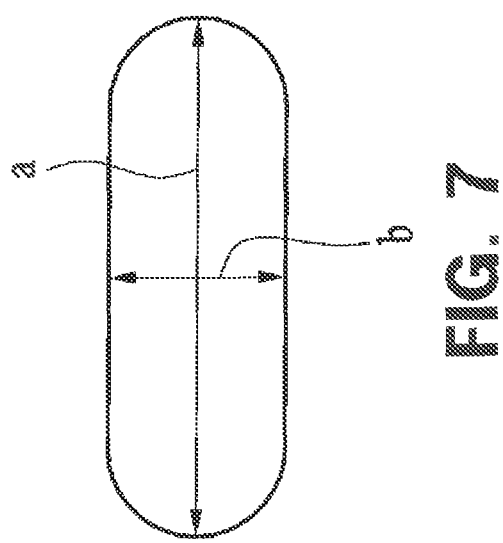
FIG. 7 is a cross-sectional view of a dispersed body according to an exemplary embodiment of the present invention.

First, the core layer will be described. In the core layer, 80% or more of the plurality of dispersed bodies included in the base preferably have an aspect ratio, indicating a ratio of the length of the minor axis with respect to the length of the major axis, of 1/2 or less, based on a vertical cross-section in the lengthwise direction, and more preferably, 90% or more of the dispersed bodies should have an aspect ratio value that is 1/2 or less. FIG. 7 shows the vertical cross-section in the lengthwise direction of the dispersed bodies that can be used in the present invention. Here, when the length of the major axis is a and the length of the minor axis is b, a relative length ratio (aspect ratio) of the length of the major axis (a) and the length of the minor axis (b) has to be 1/2 or less. In other words, when the length of the major axis (a) is 2, the length of the minor axis (b) has to be 1 or less, which is a half of the length of the major axis (a). If the dispersed bodies having an aspect ratio higher than 1/2 are more than 20% of the total number of dispersed bodies, it is difficult to achieve desired optical properties.

The dispersed bodies having an aspect ratio of 1/2 or less are divided into three or more groups having different cross-sectional areas. In detail, in FIG. 5, the dispersed bodies (201, 202) of the first group, which have the smallest cross-sectional area, the dispersed bodies (203, 204) of the second group, which have an intermediate cross-sectional area, and the dispersed bodies (205, 206) of the third group, which have the largest cross-sectional area, are randomly dispersed. In this case, the cross-sectional area of the first group is in the range of 0.2 to 2.0 $\mu m^2$, the cross-sectional area of the second group is in the range of more than 2.0 to 5.0 $\mu m^2$, the cross-sectional area of the third group is in the range of more than 5.0 to 10.0 $\mu m^2$, and the dispersed bodies of the first, second and third groups are randomly aligned. If the random-type reflective polarizer does not include any one of the first to third groups of dispersed bodies, it is difficult to achieve a desired optical property (see Table 1).

In this case, the number of the dispersed bodies of the third group may be 10% or more of the dispersed bodies having an aspect ratio of 1/2 or less. When the number of the dispersed bodies of the third group is less than 10%, an optical property may be degraded. Preferably, when the number of the dispersed bodies of the first group is in the range of 30 to 50%, and the number of the dispersed bodies of the third group is in the range of 10 to 30% of the dispersed bodies having the aspect ratio of 1/2 or less, an optical property may be improved (see Table 1).

Meanwhile, preferably, when the number of the dispersed bodies of the first group divided by the number of the dispersed bodies of the third group is in the range of 3 to 5, it can be very advantageous for maximizing an optical property (see Table 1).

The number of the dispersed bodies of the second group may be 25 to 45% of the dispersed bodies having an aspect ratio of 1/2 or less. Also, dispersed bodies outside the ranges of the cross-sectional areas of the first to third dispersed bodies may be included, in addition to the dispersed bodies having an aspect ratio of 1/2 or less.

Therefore, compared with the conventional dispersion-type reflective polarizer, the random dispersion-type reflective polarizer may be improved in the bright line visibility phenomenon, have a wide viewing angle, minimize optical loss, and maximize luminance improvement.

Also, the random dispersion-type reflective polarizer may further include the skin layer 207 on at least one surface of the above-described core layer, and the core layer may even be integrally formed among the skin layer 207. As a result, since the degradation in an optical property caused by an adhesive layer may be prevented, and since more layers may be added within a limited thickness, the optical property may be considerably improved. Further, since an elongation process is performed after the skin layer is simultaneously formed with the core layer, the skin layer of the present invention may be elongated in at least one axis direction, unlike a conventional method in which a core layer is elongated and then adhered to a non-elongated skin layer. Therefore, compared with the non-elongated skin layer, the skin layer of the present invention may have improved surface hardness, improved scratch resistance, and improved heat resistance.

Figure 6:
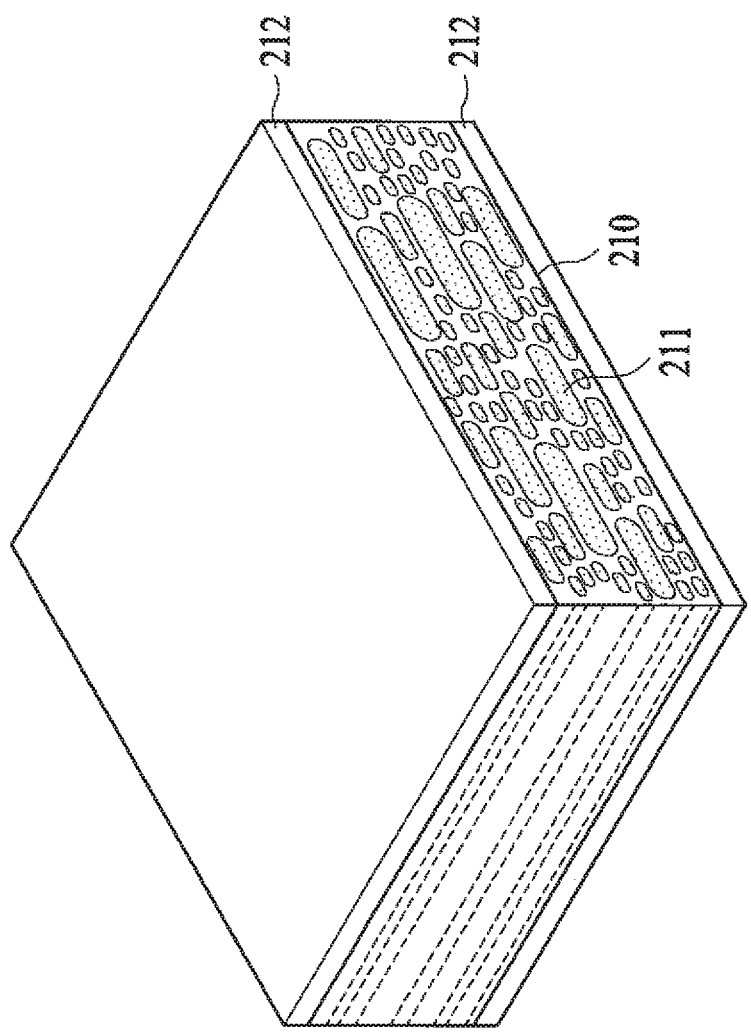
FIG. 6 is a perspective view of the random-type reflective polarizer according to the exemplary embodiment of the present invention.

FIG. 6 is a perspective view of a reflective polarizer according to an exemplary embodiment of the present invention, in which a plurality of random dispersed bodies 211 are elongated in a lengthwise direction in a base 210, and a skin layer 212 is formed on a core layer. In this case, while the random dispersed bodies 211 may be elongated in various directions, they are preferably elongated in parallel to each other to be aligned in one direction, and are more preferably elongated in parallel to each other in a direction perpendicular to light emitted from an external light source, which is effective for maximizing a light modulating effect.

According to an exemplary embodiment of the present invention, a birefringent interface may be formed between the dispersed bodies (first component) included in the base and the base (second component). In detail, in the reflective polarizer including the dispersed bodies in the base, the size of the substantial match or mismatch of refractive indexes between the base and the dispersed bodies according to the X, Y and Z axes in space influences the degree of scattering of light polarized according to each axis. Generally, a change in scattering efficiency is proportional to the square of the refractive index mismatching. Therefore, as the degree of the refractive index mismatch according to a specific axis is higher, light polarized according to the axis is more strongly scattered. Contrarily, when the refractive index mismatch according to a specific axis is low, light polarized according to the axis is scattered less. When the refractive index of the base according to an axis is substantially the same as that of the dispersed bodies, incident light polarized by an electric field parallel to the axis may pass through the dispersed bodies, without being scattered regardless of a partial size, shape and density of the dispersed bodies. Also, when the refractive indexes according to one axis are substantially the same, light substantially passes through the bodies, without being scattered. In further detail, first polarized light (P wave) may pass through the body without being influenced by the birefringent interface formed at a boundary between the base and the dispersed bodies, and second polarized light (S wave) may be modulated due to the influence of the birefringent interface formed at a boundary between the base and the dispersed bodies. Therefore, the P wave passes through the body, and the S wave is separated due to the modulation of light such as scattering and reflection of light.

Accordingly, since the light modulating effect may be caused by forming the birefringent interface between the base and the dispersed body, when the base is optically isotropic, the dispersed body may have a birefringent property. Contrarily, when the base has an optical birefringent property, the dispersed body may be optically isotropic. In detail, the dispersed body has a refractive index in the X axis direction of $nX_1$, refractive index in the Y axis direction of $nY_1$ and refractive index in the Z axis direction of $nZ_1$, and when the refractive indexes of the base are $nX_2$, $nY_2$ and $nZ_2$, in-plane birefringence between the $nX_1$ and the $nY_1$ may be generated. Preferably, one or more of the X, Y, and Z axes-refractive indexes of the base and the dispersed body may be different from one another, and more preferably, when an elongation axis is the X axis, the differences in refractive index with respect to the Y and Z axis directions may be 0.05 or less, and the difference in refractive index with respect to the X axis may be 0.1 or more. Meanwhile, generally, when the difference in refractive index of 0.05 or less, it is interpreted as a match.

Meanwhile, in the present invention, a thickness of the base may be, but is not limited to, in the range of 20 to 180 μm, and a thickness of the skin layer may be, but is not limited to, in the range of 50 to 500 μm. Also, the total number of the dispersed bodies may be in the range of 25,000,000 to 80,000,000, when the thickness of the base based on a size of 32 inches is 120 μm, but the present invention is not limited thereto.

FIG. 6 is a perspective view of a reflective polarizer which has a structured surface layer according to the exemplary embodiment of the present invention, in which a plurality of dispersed bodies are elongated in the lengthwise direction in a base, and form a core layer. In this case, the dispersed bodies may be elongated in various directions, are preferably elongated parallel to each other to be aligned in one direction, and are more preferably elongated parallel to each other in a direction perpendicular to light emitted from an external light source, which is effective for maximizing the light modulating effect. A primer layer (not shown) may be selectively formed on one surface of the skin layer 212 (one surface of the base when the skin layer is not included). Therefore, an adhesive strength, an appearance and an electrical/optical property of the structured surface layer may be improved. As a material for the structured surface layer, acryl, esters or urethane may be used, but the present invention is not limited thereto. The primer layer may be formed thinner than other layers, and may be improved in light transmittance and reduce reflectivity by adjusting a thickness of the primer layer.

The thickness of such a primer layer may be in the range of 5 to 300 nm. When the thickness of the primer layer is less than 5 nm, an adhesive strength between the core layer and the structured surface layer may be insignificant, and when the thickness of the primer layer is more than 300 nm, spots or agglomeration of molecules may be generated during the primer treatment.

Meanwhile, as the structured surface layer is formed on at least one surface of the reflective polarizer of the present invention, a light collecting effect may be maximized, irregular reflection on its surface may be prevented, and luminance may be considerably improved. The structured surface layer may be formed on the base or on the primer layer.

The structured surface layer that can be used in the present invention, may be a structure capable of improving the light collecting effect, and is preferably a micropattern layer. A micropattern that can be used in this case may be one or more selected from a prism pattern, a lenticular pattern, a microlens pattern, a triangular pyramid pattern, and a pyramid pattern, which may be used alone or in combination thereof.

Figure 8:
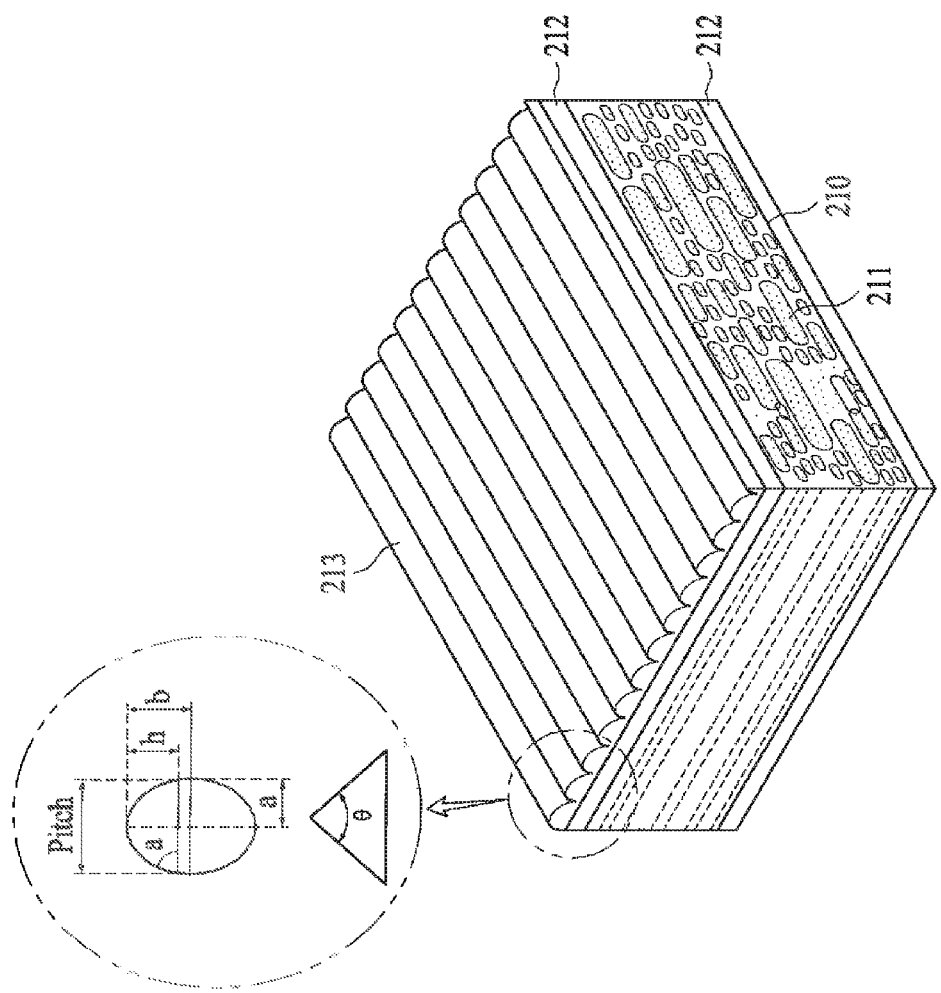
FIG. 8 is a perspective view of a reflective polarizer in which lenticular patterns are regularly formed according to an exemplary embodiment of the present invention.

In FIG. 8, a skin layer 212 and a lenticular pattern layer 213 may be formed on one surface of a base layer of a reflective polarizer, and here, a lenticular height (a) may be in the range of 10 to 50 μm. When the height of the lenticular pattern is less than 10 μm, it may be difficult to realize the pattern layer, and when the height of the lenticular pattern is more than 50 μm, luminance may be reduced due to an increase in an amount of total reflected light.

Also, a lenticular pitch (b) may be in the range of 20 to 100 μm. When the pitch of the lenticular pattern is less than 20 μm, a light collecting effect of the lens shape may be slightly decreased due to an increase in a concave part of the film per unit area, and the limits of the degree of precision in shape processing and a pattern shape are too narrow to realize the pattern. On the other hand, when the pitch of the lenticular pattern is more than 100 μm, a moiré phenomenon is highly likely to occur between the pattern structure and a panel.

Meanwhile, in a lenticular lens, when a minor axis radius of an elliptical cross-section is defined as a, and a major axis radius thereof is defined as b, a ratio of the major axis/minor axis (b/a) is in the range of 1.0 to 3.0. When the ratio of the major axis/minor axis (b/a) is outside the above range, bright line shielding efficiency with respect to light passing through a birefringent polarized layer may be reduced.

Also, when the height of the lenticular lens is defined as h, a tangential angle α at both ends of the lower part of the lens has to be in the range of 30 to 80 degrees. Here, when α is smaller than 30 degrees, the bright line shielding efficiency is decreased, and when α is larger than 80 degrees, it is difficult to manufacture the lens pattern. When the sectional shape of the lenticular lens is triangular, for the bright line shielding effect, a vertex angle θ may be in the range of 90 to 120 degrees.

Figure 9:
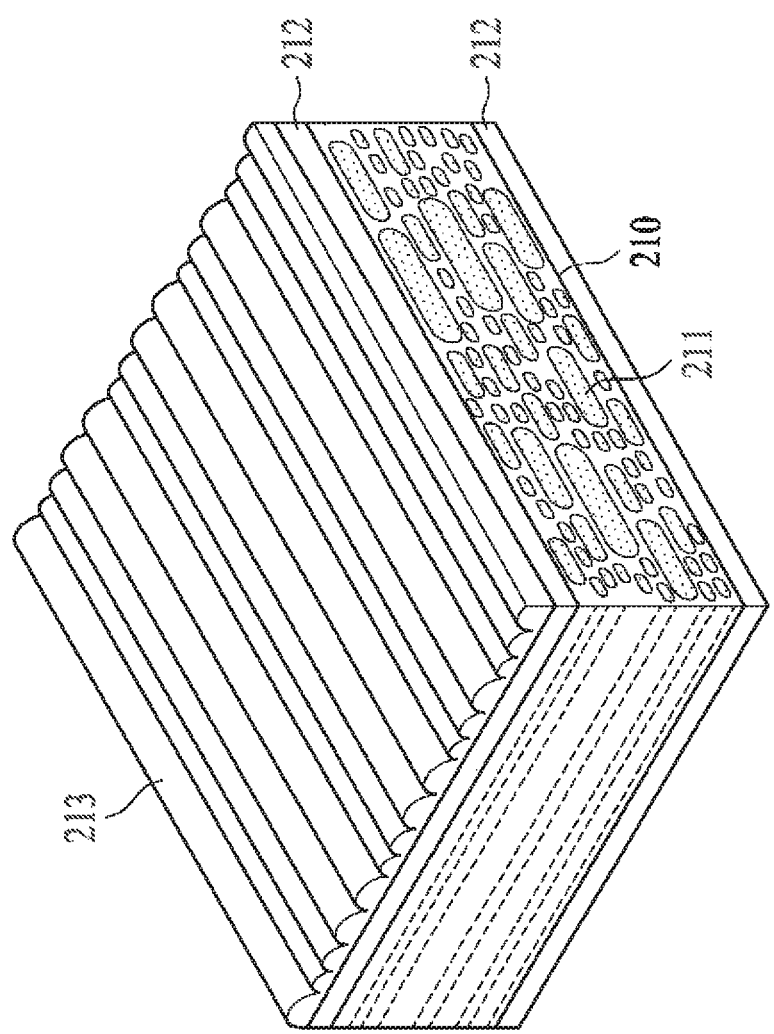
FIG. 9 is a perspective view of a reflective polarizer in which lenticular patterns are irregularly formed.

Meanwhile, the lenticular shape may be formed with patterns having the same height and pitch as shown in FIG. 8, or may be formed with lenticular patterns having different heights and pitches as shown in FIG. 9.

Figure 10:
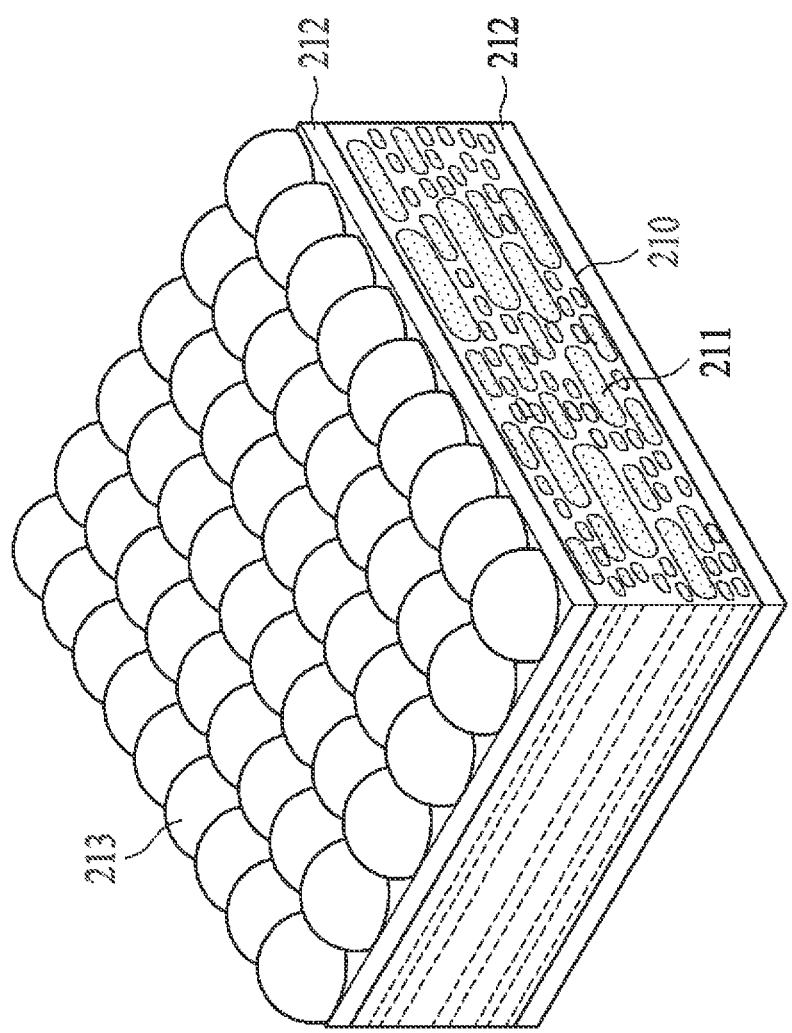
FIG. 10 is a perspective view of a reflective polarizer in which microlenses are regularly formed according to an exemplary embodiment of the present invention.

FIG. 10 shows a microlens pattern layer that is formed on one surface of a reflective polarizer, and here, a height of the microlens may be in the range of 10 to 50 μm. When the height of the microlens pattern is less than 10 μm, a light collecting effect may be slightly decreased, and it may be difficult to realize a pattern. When the height of the microlens pattern is more than 50 μm, a moiré phenomenon may easily occur, and a problem of showing the pattern in an image may occur.

Also, a diameter of the microlens may be in the range of 20 to 100 μm. Preferably, the diameter of the microlens is in the range of 30 to 60 μm. In the above range, the microlens may have a good appearance characteristic, and an excellent light collecting function and an excellent light diffusion property, and may facilitate actual production. When the diameter of the microlens pattern is less than 20 μm, low light collecting efficiency with respect to light incident at an invalid angle may be exhibited, and when the diameter of the microlens pattern is more than 100 μm, light collecting efficiency with respect to vertical light may be degraded, and a moiré phenomenon may occur.

Figure 11:
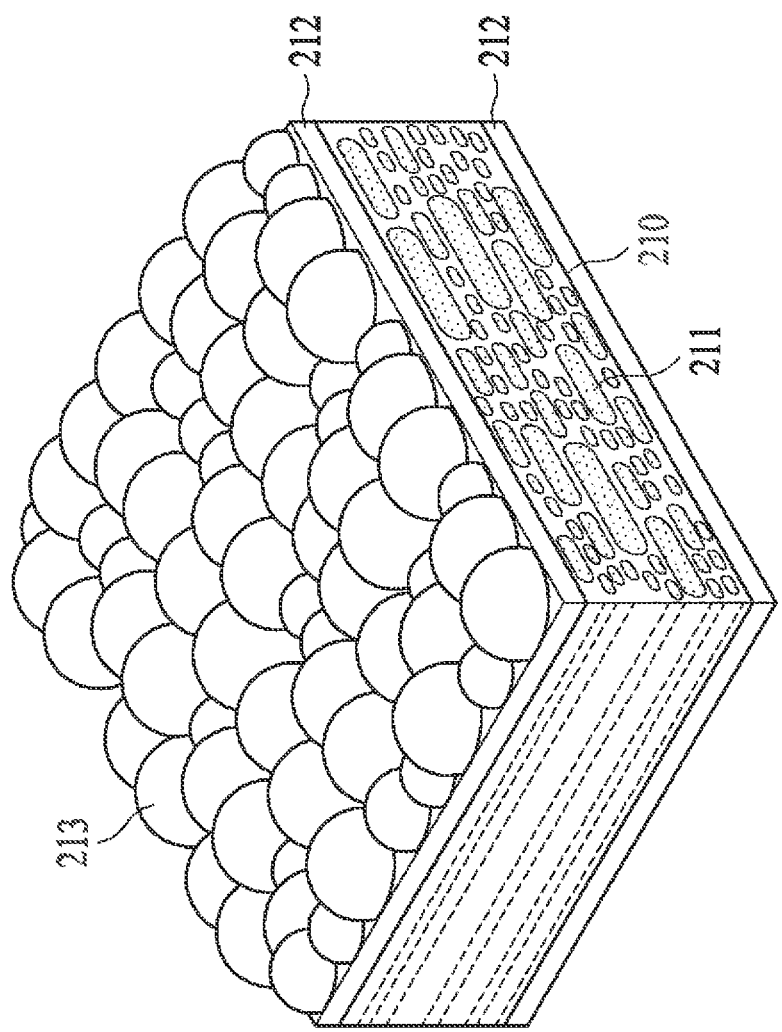
FIG. 11 is a perspective view of a reflective polarizer in which microlenses are irregularly formed.

Meanwhile, the microlens pattern layer may also be formed with patterns having the same height and diameter as shown in FIG. 10, or may be formed with microlens patterns having different heights and diameters as shown in FIG. 11. Since such a microlens pattern has a large difference in an optical property according to the density and aspect ratio of the lens, the density may be increased to the maximum level, and the aspect ratio may be ideally 1/2.

Figure 12:
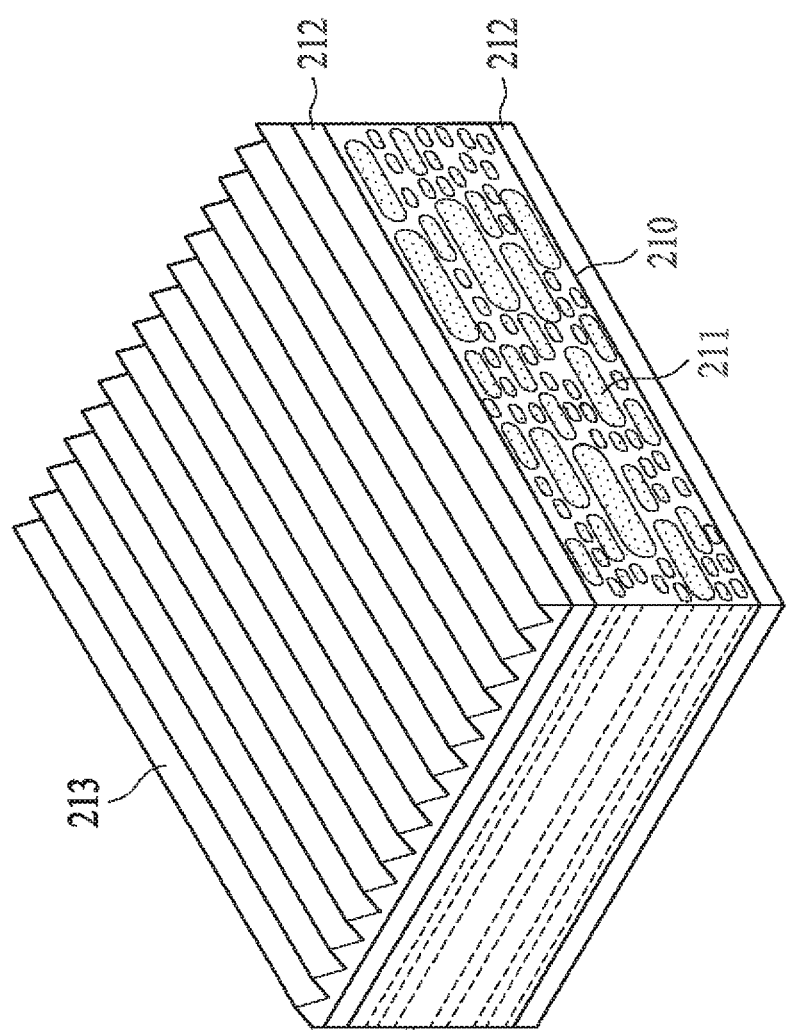
FIG. 12 is a perspective view of a reflective polarizer in which prism patterns are regularly formed according to an exemplary embodiment of the present invention.

In FIG. 12, a prism pattern layer 213 is formed on one surface of a reflective polarizer, and here, a prism height (a) may be in the range of 10 to 50 μm. When the height of the prism pattern is less than 10 μm, during the formation of a shape of the prism pattern part, a base film may be damaged by pressure, and when the height of the prism pattern is more than 50 μm, transmittance of light incident to a light source may be reduced.

Also, a prism pitch (b) may be in the range of 20 to 100 μm. When the pitch of the prism pattern is less than 20 μm, engraving is difficult, and processes of realizing and forming the pattern layer may be complicated. When the pitch of the prism pattern is more than 100 μm, the moiré phenomenon may easily occur, and the pattern may be shown in an image.

Figure 13:
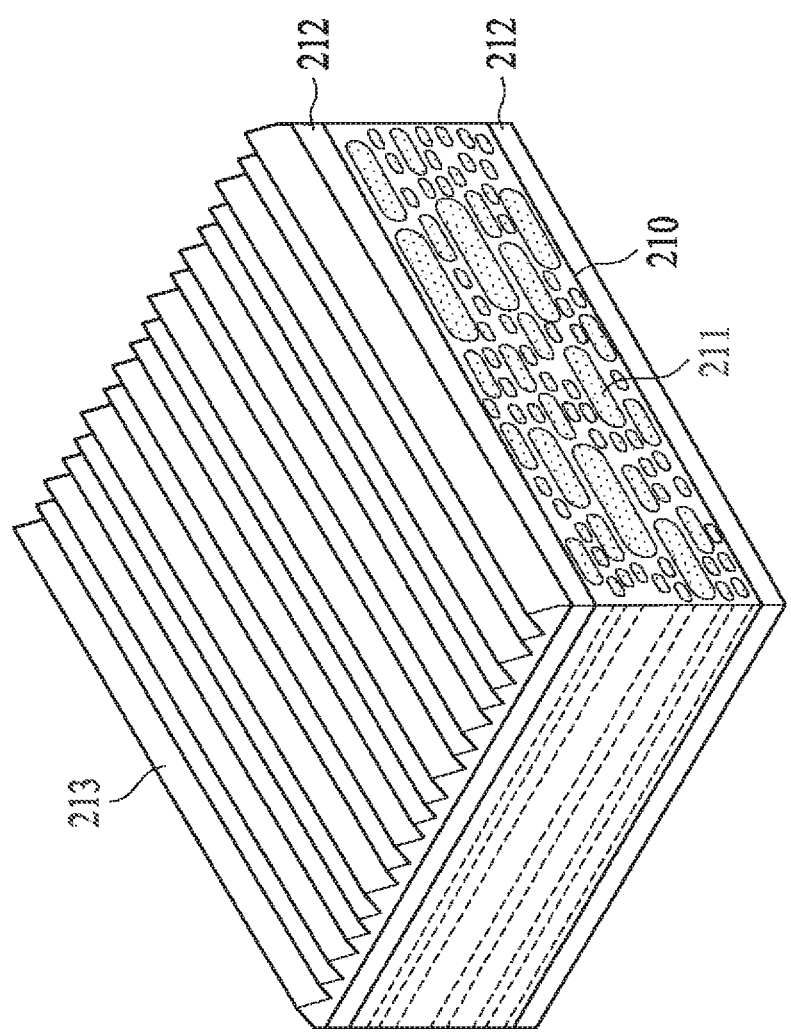
FIG. 13 is a perspective view of a reflective polarizer in which prism patterns are irregularly formed.

Meanwhile, the prism shape may have patterns with the same height and pitch as shown in FIG. 12, or have a combination of prism patterns with different heights and pitches as shown in FIG. 13. Such a prism pattern may be formed of a material having a higher refractive index than a base film. This is because, when the refractive index of the base film is higher, a part of light incident to the bottom surface of the base film is total-reflected on the surface of the prism pattern, and thus cannot be incident to the prism structure. The prism shape is preferably a linear prism shape, and has a triangle-shaped vertical cross-section, in which an angle between the vertex and the bottom surface facing the vertex may be 60 to 110°.

A material for the structured surface layer may be a polymer resin such as a heat-curable or photocurable acrylic resin. For example, the prism pattern may be formed of a vinyl cyanide compound such as an unsaturated fatty acid ester, an aromatic vinyl compound, an unsaturated fatty acid and a derivative thereof, or methacrylnitrile, and specifically, a urethane acrylate, or a methacrylic acrylate resin. Also, the structured surface layer may be formed of a material having a refractive index higher than the reflective polarizer.

And now, a method of manufacturing a random dispersion-type reflective polarizer will be described.

First, in the step (1), a base component, a dispersed body component and a skin layer component are supplied to an extrusion unit. The base component may be any material that can be conventionally used in a reflective polarizer in which dispersed bodies are dispersed without limitation, and is preferably polyethylenenaphthalate (PEN), co-polyethylenenaphthalate (co-PEN), polyethyleneterephthalate (PET), polycarbonate (PC), a polycarbonate (PC) alloy, polystyrene (PS), heat-resistant polystyrene (PS), polymethylmethacrylate (PMMA), polybutylene terephthalate (PBT), polypropylene (PP), polyethylene (PE), acrylonitrilebutadienestyrene (ABS), polyurethane (PU), polyimide (PI), polyvinylchloride (PVC), a styrene-acrylonitrile (SAN) copolymer, ethylene vinyl acetate (EVA), polyamide (PA), polyacetal (POM), phenol, epoxy (EP), urea (UF), melanin (MF), unsaturated polyester (UP), silicone (SI), and a cyclo-olefin polymer, and more preferably, PEN.

The dispersed body component may be any material that can be conventionally used in a reflective polarizer in which dispersed bodies are dispersed without limitation, and is preferably, polyethylenenaphthalate (PEN), co-polyethylenenaphthalate (co-PEN), polyethyleneterephthalate (PET), polycarbonate (PC), a polycarbonate (PC) alloy, polystyrene (PS), heat-resistant polystyrene (PS), polymethylmethacrylate (PMMA), polybutylene terephthalate (PBT), polypropylene (PP), polyethylene (PE), acrylonitrilebutadienestyrene (ABS), polyurethane (PU), polyimide (PI), polyvinylchloride (PVC), a styrene-acrylonitrile (SAN) copolymer, ethylene vinyl acetate (EVA), polyamide (PA), polyacetal (POM), phenol, epoxy (EP), urea (UF), melanin (MF), unsaturated polyester (UP), silicone (SI) and a cyclo-olefin polymer, which may be used alone or in combination thereof, and more preferably, dimethyl-2,6-naphthalene dicarboxylate, dimethyl terephthalate, and co-PEN prepared by suitably polymerizing monomers such as ethylene glycol, cyclohexanedimethanol (CHDM), etc.

The skin layer component may be a conventionally used component, and preferably, any component that can be used in a reflective polarizer without limitation. The component may be polyethylenenaphthalate (PEN), co-polyethylenenaphthalate (co-PEN), polyethyleneterephthalate (PET), polycarbonate (PC), a polycarbonate (PC) alloy, polystyrene (PS), heat-resistant polystyrene (PS), polymethylmethacrylate (PMMA), polybutylene terephthalate (PBT), polypropylene (PP), polyethylene (PE), acrylonitrilebutadienestyrene (ABS), polyurethane (PU), polyimide (PI), polyvinylchloride (PVC), a styrene-acrylonitrile (SAN) copolymer, ethylene vinyl acetate (EVA), polyamide (PA), polyacetal (POM), phenol, epoxy (EP), urea (UF), melanin (MF), unsaturated polyester (UP), silicone (SI) and a cyclo-olefin polymer, which may be used alone or in combination thereof, and preferably, dimethyl-2,6-naphthalene dicarboxylate, dimethyl terephthalate, and co-PEN prepared by suitably polymerizing monomers such as ethylene glycol, cyclohexanedimethanol (CHDM), etc.

Meanwhile, the base component and the dispersed body component may be separately provided to independent extrusion units, and in this case, there are two or more extrusion units. Also, the present invention further includes providing polymers to one extrusion unit including a separate inlet and a separate outlet without mixing the polymers. The extrusion unit may be an extruder, and further include a heating means to convert the solid polymers provided to the extrusion unit into a liquid.

To align the dispersed body component in the base component, the reflective polarizer is designed to have a viscosity difference to cause a difference in flowability of the polymer, and preferably to allow the flowability of the base component to be higher than the dispersed body component. Then, while the base component and the dispersed body component pass through a mixing zone and a mesh-filter zone, the dispersed body component is randomly aligned in the base according to the difference in viscosity.

Subsequently, the skin layer component transferred by the extrusion unit may be laminated on at least one surface of the core layer. Preferably, the skin layer component is laminated on both surfaces of the core layer. When the skin layer is laminated on both surfaces of the core layer, materials and thicknesses of the skin layers may be the same or different from each other.

Figure 14:
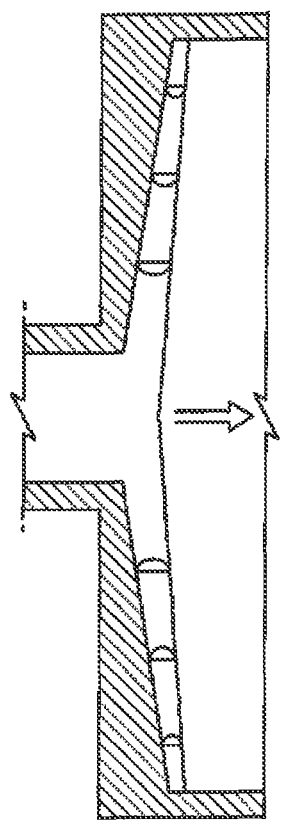
FIG. 14 is a cross-sectional view of a coat-hanger die according to an exemplary embodiment of the present invention.
Figure 15:
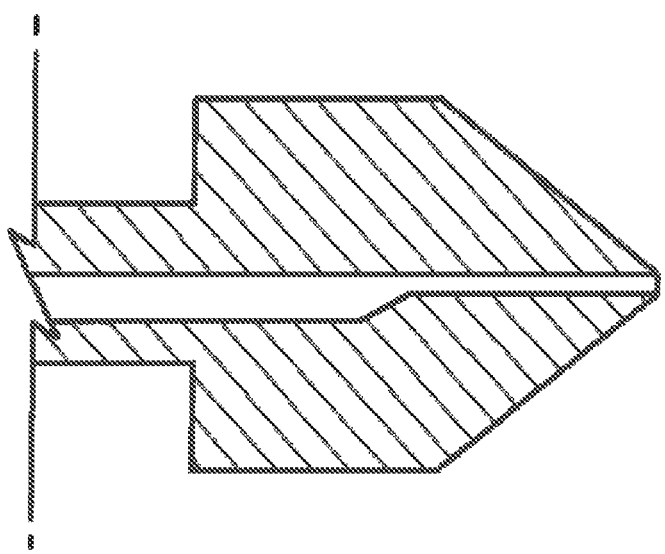
FIG. 15 is a side view thereof.

Subsequently, a flow controlling unit induces spreading of the dispersed body component included in the base to be randomly aligned. In detail, FIG. 14 is a cross-sectional view of a coat-hanger die, which is one of the exemplary flow controlling units that can be used in the present invention, and FIG. 15 is a side view thereof. Using the coat-hanger die, a degree of spreading the base may be suitably controlled, and thus a size of the cross-sectional area and alignment of the dispersed body component may be randomly controlled. Referring to FIG. 14, since the base laminated with the skin layers, which is transferred through a fluid path, widely spreads from side to side, the dispersed body component therein also widely spreads from side to side.

According to an exemplary embodiment of the present invention, the method may further include cooling and planarizing the spread polarizer transferred from the flow controlling unit; elongating the polarizer going through the planarization; and heat-setting the elongated polarizer.

First, the step of cooling and planarizing the polarizer transferred from the flow controlling unit may include cooling the polarizer to solidify, and planarizing the polarizer by a casting roll process.

Afterward, the method may further include elongating the polarizer subjected to the planarization. The elongation may be performed by a conventional elongation process for a reflective polarizer, and thus may induce a difference in refractive index between the base component and the dispersed body component, resulting in light modulation generated at the interface thereof. Therefore, an aspect ratio of the spread first component (dispersed body component) is further reduced by elongation. To this end, the elongating process may be uniaxial elongation or biaxial elongation, and is preferably uniaxial elongation. The uniaxial elongating may be performed in the lengthwise direction of the first component as an elongating direction. Also, an elongation ratio may be in the range from 3 to 12. Meanwhile, a method of changing a body with isotropy to birefringence is conventionally known, and for example, when the elongation is performed under a suitable temperature condition, molecules of the dispersed bodies are elongated and thus the body component may become birefringent.

Then, a final reflective polarizer may be manufactured through heat-setting the elongated polarizer. The heat-setting may be performed by a conventional method, and is preferably performed at 180 to 200° C. for 0.1 to 3 minutes using an IR heater.

Subsequently, in the step (2), a structured surface layer is formed on at least one surface of the reflective polarizer (the core layer or the skin layer). Here, to more easily form the structured surface layer, a primer layer may be further formed on at least one surface of the core layer (or the skin layer). Therefore, an adhesive strength, an appearance, and an electrical/optical property of the structured surface layer may be improved. As a material for the structured surface layer, acryl, ester, or urethane may be used, but the present invention is not limited thereto. The primer layer may be formed thinner than the other layers, and as a thickness of the primer layer may be adjusted, light transmittance may be improved, and reflectivity may be reduced.

A thickness of such a primer layer may be 5 to 300 nm. When the thickness of the primer layer is less than 5 nm, the adhesive strength between the core layer and the structured surface layer may be insignificant, and when the thickness of the primer layer is more than 300 nm, spots or agglomeration of molecules may be generated during the primer treatment.

Meanwhile, since the reflective polarizer of the present invention may have the structured surface layer at least one surface thereof, the light collecting effect may be maximized, irregular reflection on its surface may be prevented, and luminance may be considerably improved.

The structured surface layer that can be used in the present invention may be a structure capable of improving the light collecting effect, and is preferably a micropattern layer. A micropattern that can be used in this case may be one or more selected from the group consisting of a prism pattern, a lenticular pattern, a microlens pattern, a triangular pyramid pattern, and a pyramid pattern, which may be used alone or in combination thereof. Also, even when the micropattern is formed in a single pattern, the patterns may be uniform, or the patterns with different heights or pitches may be aligned.

A material for the structured surface layer may be a polymer resin such as a heat-curable or photocurable acrylic resin. For example, the prism pattern may be formed of a vinyl cyanide compound such as an unsaturated fatty acid ester, an aromatic vinyl compound, an unsaturated fatty acid and a derivative thereof, or methacrylnitrile, and specifically, urethane acrylate, or a methacrylic acrylate resin. Also, the structured surface layer may be formed of a material having a refractive index higher than the reflective polarizer.

Meanwhile, the micropattern layer may be formed using a mold film for patterning. As a material for the mold film for patterning, a transparent and flexible film having a predetermined tensile strength and durability may be used, and preferably a PET film is used.

In this case, according to an exemplary embodiment of the present invention, the step (2) may include: 2-1) transferring a reflective polarizer to be in contact with a master roll having one surface on which a reverse pattern of the structured surface layer is formed, and applying a melted polymer resin to the patterned surface of the master roll or the core layer; and 2-2) UV-curing the polymer resin by UV or heat while the polymer resin is pressure-molded on the patterned surface of the master roll and separating the polymer resin.

According to another exemplary embodiment of the present invention, after the step 2-2), the polymer resin may be secondarily cured by applying UV rays or heat again.

Figure 16:
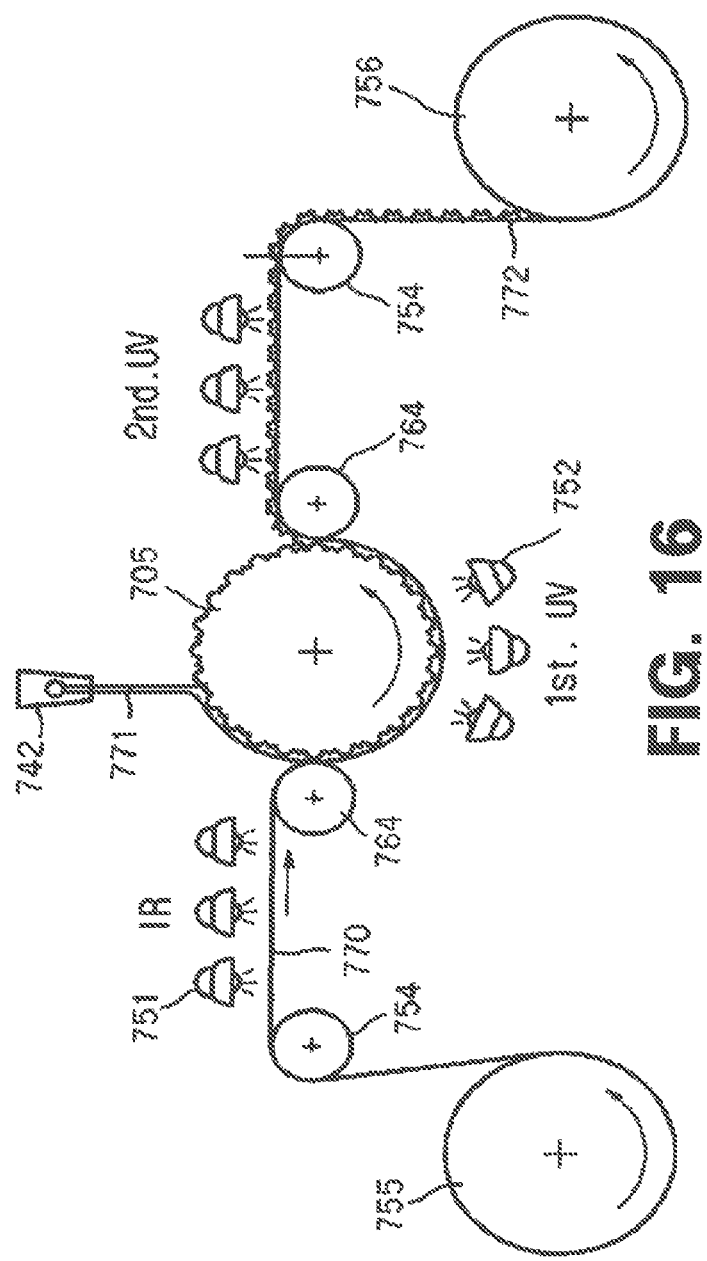
FIG. 16 is a schematic diagram illustrating a process of forming a micropattern according to an exemplary embodiment of the present invention.
Figure 17:
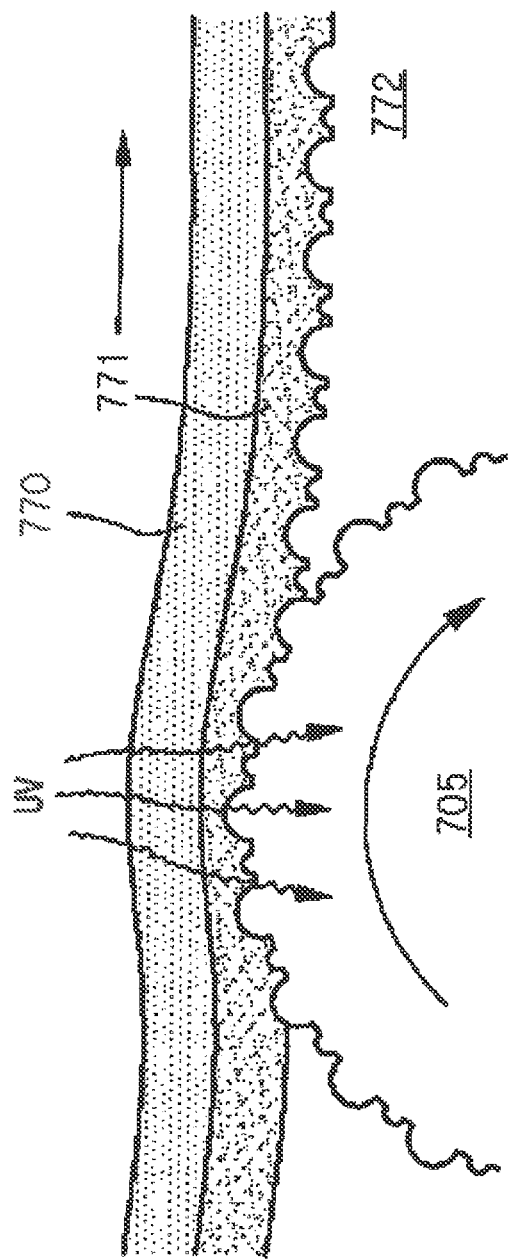
FIG. 17 is a cross-sectional view illustrating a detailed structure of the molding unit of FIG. 16.

In detail, FIG. 16 is a schematic diagram illustrating a process of forming a micropattern according to an exemplary embodiment of the present invention, and FIG. 17 is a cross-sectional view illustrating a detailed structure of the molding unit of FIG. 16. In FIG. 16, a reflective polarizer 770 is unwound from a start roll 755, and passes over a guide roll 754 and then to an infrared lamp 751. In this process, a surface of the reflective polarizer 770 may be modified by infrared (IR) rays emitted from an IR lamp, and thus adhesion of the reflective polarizer 770 to a patterning layer 771 is enhanced. When the reflective polarizer 770 leaving the start roll 755 is led onto a master roll 705 via a pattern guide roll 764, a material for the patterning layer 771 and a pattern layer polymer is applied to a patterned surface of the master roll 705 from the inlet 742, and then the resultant product is laminated with a reflective polarizer 770. In this process, the resin is melted at room temperature, and first curing may be performed by first UV rays emitted from a first UV curing apparatus 752 installed under the master roll 705. Here, a temperature around the curing apparatus 752 is 20 to 30° C., and a temperature of heat generated when the resin is cured is 40 to 80° C., those temperatures being approximately a glass transition temperature (Tg: a temperature at which the polymer resin exhibits a change to a soft rubber-like characteristic before undergoing a complete phase change from solid to liquid) of the resin. The patterning layer 771 with a complete copy of a pattern shape on a surface of the master roll passes over another pattern guide roll 764 in the glass transition state to be molded onto a patterned reflective polarizer 772 in which the reflective polarizer 770 and the patterning layer 771 are combined, and then is wound around a finish roll 756 via the guide roll 754.

A cross-section of the reflective polarizer 772 in which a turn made by applying UV rays twice is formed as shown in FIG. 16 is a cross-section having an opposite shape to the cross-section of the master roll 705, and if, for example, the master roll is an engraved surface, the turn-formed reflective polarizer 772 is an embossed surface.

In this case, according to an exemplary the present invention, the step (2) may include: a) transferring the reflective polarizer; b) transferring a mold film for patterning having one surface on which a reverse pattern of the structured surface layer is formed; c) contacting the surface of the mold film for patterning on which the pattern is formed with one surface of the reflective polarizer; d) injecting a flowable material into the region in which the reflective polarizer is in contact with the mold film for patterning to fill a space between the patterns; e) applying the material to the reflective polarizer by curing the material filled between the patterns; and f) separating the reflective polarizer coated with the material from the mold film for patterning, wherein the steps a) and b) may be performed in any order.

Between the step d) and the step e), the method may further include uniformly filling the space between the patterns with the material by applying pressure to the skin layer and the mold film, which are in contact with each other.

Preferably, the step e) may include applying heat or UV rays to the material-filled patterns.

Figure 18:
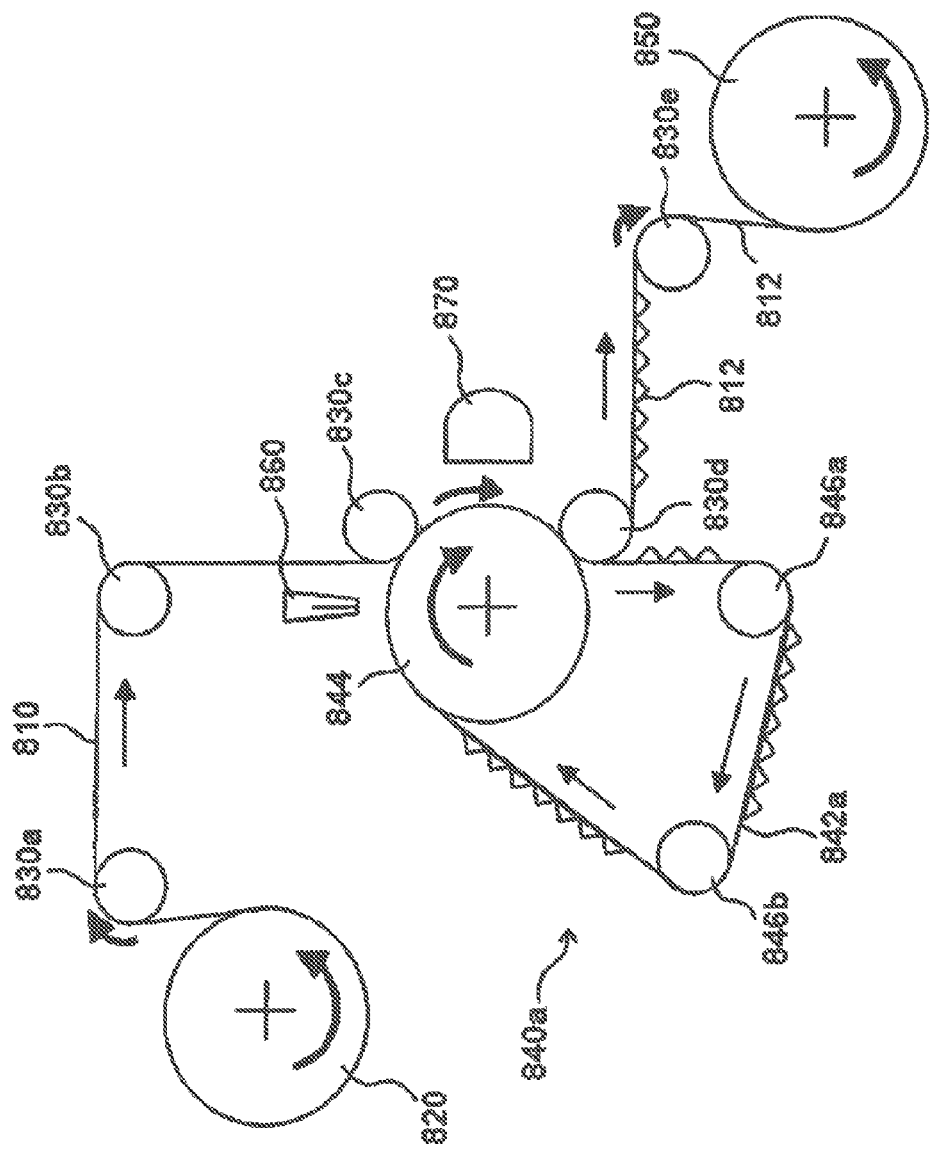
FIG. 18 is a schematic diagram illustrating a process of forming a micropattern according to an exemplary embodiment of the present invention.

In detail, FIG. 18 is a schematic diagram illustrating a process of forming a micropattern according to another exemplary embodiment of the present invention. First, a reflective polarizer 810 winding around a first roll 820 is transferred by guide rolls 830a to 830c. Here, a replication mold 842 of a pattern molding unit 840 is wound around a master roll 844 and pattern guide rolls 846a and 846b, and is transferred/rotated. Here, since the master roll 844 is engaged with the guide rolls 830c and 830d, the reflective polarizer 810 is engaged with the replication mold 842 by being guided by the guide roll 830c. Here, the guide roll 830c serves as a gap for controlling a thickness of a coating solution applied to the reflective polarizer 810, that is, a pattern layer of a reflective polarizer 812 in which the pattern layer is resin-carved. In further detail, when the guide roll 830c is in close contact with the master roll 844, the pattern layer of the reflective polarizer may be formed thinner, and contrarily, when the guide roll 830c is spaced further apart from the master roll, the pattern layer of the reflective polarizer may be formed thicker. A thickness of such a pattern layer of the reflective polarizer can be controlled by a viscosity of a coating solution, a patterning rate, and a tension of the reflective polarizer, as well as a gap between the guide roll 830c and the master roll 844.

Meanwhile, in the reflective polarizer 810, a coating solution is injected into a region in which the guide roll 830c and the master roll 844 are engaged by a coating solution injecting means 860, enters into patterns of the replication mold 842 to fill, and then is uniformly distributed by pressure between the guide roll 830c and the master roll 844, resulting in replication molding a pattern. The coating solution distributed between the patterns is cured by heat or UV emitted from a curing means 870. The reflective polarizer in which a patterned coating solution is cured and applied is pulled by the guide roll 830d and thus separated from the replication mold 842, and the patterned reflective polarizer 812 is transferred by a guide roll 830e to wind around a second roll 850. Here, the guide roll 830d may be used for peeling such that the coating solution-coated, that is, the pattern layer-formed reflective polarizer 812 is separated from the replication mold 842.

Here, the reflective polarizer 810 and the reflective polarizer 812 in which the pattern layer is formed are connected to each other, but are differentiated from each other for convenience of description. That is, the reflective polarizer 810 refers to a state before the pattern is formed, and the pattern layer-formed reflective polarizer 812 refers to a state in which the reflective polarizer is coated with the patterned coating solution while passing through the pattern molding unit 840 to complete the pattern replication molding. Also, FIG. 18 shows only a part of the pattern layer formed on the pattern layer-formed reflective polarizer 812, and actually, a pattern layer is also formed on the reflective polarizer winding around the second roll 850.

Figure 19:
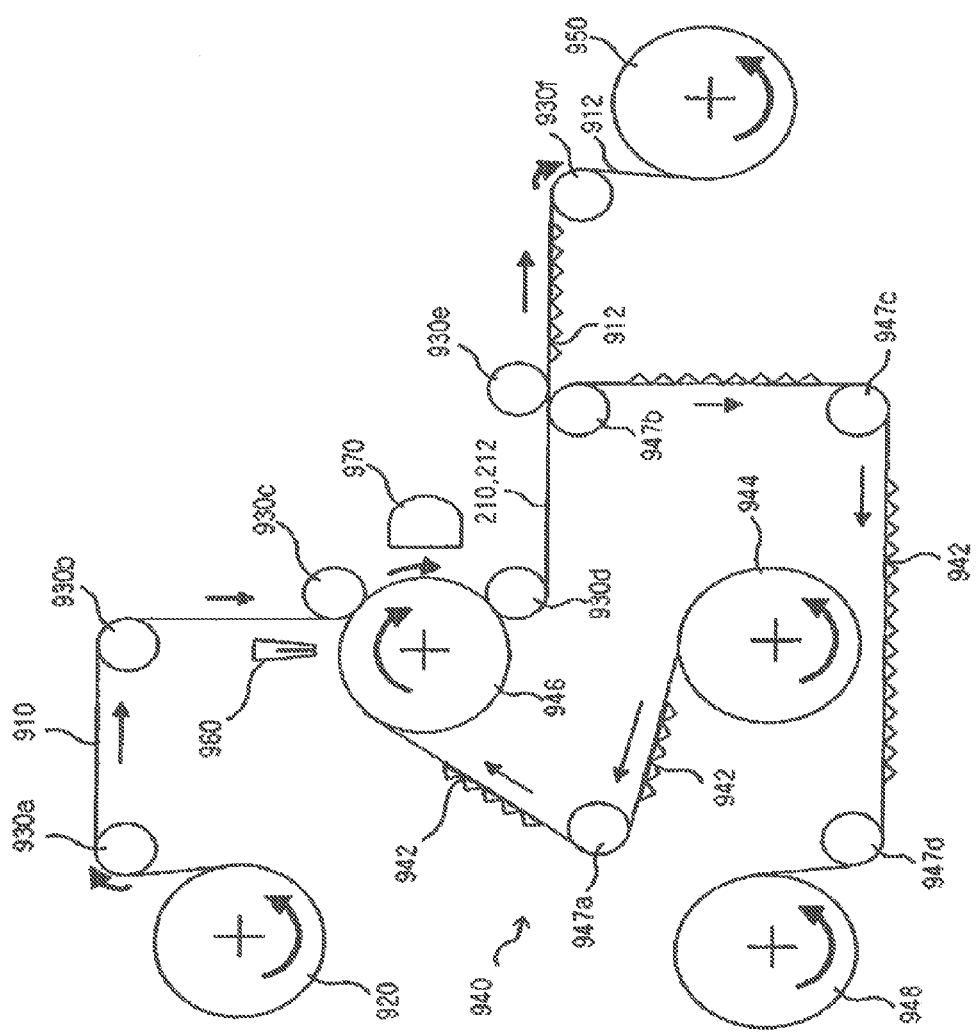
FIG. 19 is a schematic diagram illustrating a process of forming a micropattern according to an exemplary embodiment of the present invention.

FIG. 19 is a schematic diagram illustrating a process of forming a micropattern according to another exemplary embodiment of the present invention. In detail, FIG. 19 is an example in which there is no joint in a replication mold 942 in a pattern layer-formed reflective polarizer 912 due to being formed as long as a length of a reflective polarizer 910 in a roll type.

According to a second exemplary embodiment of the present invention, an apparatus for forming an optical member also includes a first roll 920 around which the reflective polarizer 910 is wound and a second roll 950 around which a pattern layer-formed reflective polarizer 912 is would, which are provided at both sides, and guide rolls 930a to 930f for transferring the reflective polarizer and the pattern layer-formed reflective polarizer, which are provided between the first roll 920 and the second roll 950. Also, to apply a patterned coating solution to the reflective polarizer 910, a master roll 946 of a pattern molding unit 940 is in contact with a guide roll 930c and a guide roll 930d. Here, a number and positions of the guide rolls 930a to 930f can be changed according to an implemented state. The pattern molding unit 940 is composed of the film-shaped replication mold 942 on which a pattern shape is realized, a replication mold-winding third roll 944, the master roll 946 for pressing an injected coating solution in the replication mold to enable pattern replication of the coating solution as the pattern of the replication mold, and applying it to the reflective polarizer 910, the pattern guide rolls 947a to 947d transferring the replication mold, and a fourth roll 948 around which the transferred replication mold is wound. The number and positions of the pattern guide rolls 947a to 947d may also be changed according to an implemented state.

While winding around the third roll 944, the replication mold 942 is, unlike the exemplary embodiment of FIG. 18, transferred by the master roll 946 and the guide rolls 947a to 947d to replicate a pattern formed of the coating solution on the reflective polarizer 910, and is wound around the fourth roll 948. Here, the replication mold 942 may be formed to have the same length as the reflective polarizer 910, and therefore the pattern is uniformly formed throughout the entire region without pattern failure or pattern disconnection on the pattern layer-formed reflective polarizer 912, which is caused by a joint. In FIG. 19, a part of the pattern realized on a pattern layer of the replication mold is illustrated, but in actual implementation, the pattern is realized throughout the entire replication mold.

A coating solution injecting means 960 for injecting the coating solution is included at a point in which the reflective polarizer 910 is drawn into the pattern molding unit 940, that is, a point at which the guide roll 930c is in contact with the master roll 946, and a curing means 970 for curing the coating solution by heat or irradiation of UV rays is included at the point in which the reflective polarizer moves while in contact with the replication mold 942.

Figure 20:
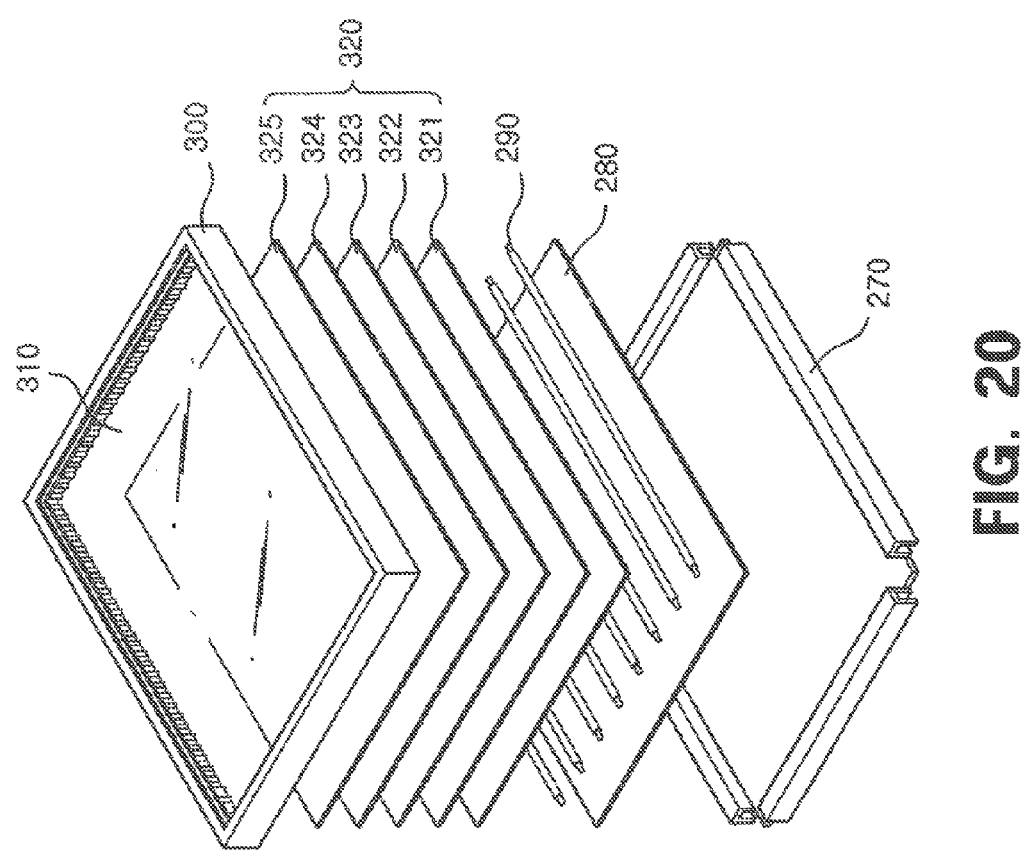
FIG. 20 is an exploded perspective view of a reflective polarizer in which dispersed bodies are dispersed, including the reflective polarizer of the present invention, according to another exemplary embodiment of the present invention.

In detail, FIG. 20 shows an example of a LCD employing the reflective polarizer of the present invention, in which a reflective sheet 280 is inserted onto a frame 270, and a cold cathode fluorescent lamp 290 is positioned on a top surface of the reflective sheet 280. An optical film 320 is positioned on a top surface of the cold cathode fluorescent lamp 290, and may include a diffusion plate 321, a light diffusion film 322, a prism film 323, a reflective polarizer 324 and an absorptive polarizing film 325, which may be sequentially stacked. Alternatively, the stacking order may be changed depending on a purpose, or some of the above components may be omitted or may be included in plural. For example, the diffusion plate 321, the light diffusion film 322 or the prism film 323 may be excluded from the overall configuration, and may be stacked in a different order or formed at different positions. Moreover, a retardation film (not illustrated) may also be inserted at a suitable place in the LCD. Meanwhile, a liquid crystal display panel 310 which is inserted into a mold frame 300 may be positioned on a top surface of the optical film 320.

When examined based on the pathway of light, light emitted from the cold cathode fluorescent lamp 290 reaches the diffusion plate 321 of the optical film 320. The light transferred by the diffusion plate 321 passes through the light diffusion film 322 to propagate perpendicularly to the optical film 320. The light passing through the light diffusion film 322 reaches the reflective polarizer 324 via the prism film 323, resulting in light modulation. In detail, the P wave passes through the reflective polarizer 324 without loss, but the S wave is, due to the light modulation (reflection, scattering, refraction, etc.), reflected again by the reflective sheet 280, which is the bottom surface of the cold cathode fluorescent lamp 290, is randomly changed into the P wave, and then passes through the reflective polarizer 324 again. After passing through the absorptive polarizing film 325, the waves reach the liquid crystal display panel 310. As a result, due to the above-described principle, when the reflective polarizer of the present invention is inserted into the LCD, compared with a conventional reflective polarizer, rapid improvement in luminance may be expected. Meanwhile, the cold cathode fluorescent lamp 290 may be replaced by an LED.

Meanwhile, the present invention focuses on an LCD to explain the use of the reflective polarizer, but is not limited thereto, and thus the reflective polarizer may be widely used in flat panel display technology including a projection display, a plasma display, a field emission display and an electroluminescent display.

Hereinafter, the present invention will be described in detail with reference to examples and experimental examples. The examples and the experimental examples are merely provided to explain the present invention, but the scope of the present invention is not limited to the examples and the experimental examples.

Example 1

Polyethylene naphthalate (PEN) having a refractive index of 1.65 as a dispersed body component, and a raw material including 60 wt % of polycarbonate, 38 wt % of poly cyclohexylene dimethylene terephthalate (PCTG) prepared by polymerizing terephthalate with ethylglycol and cyclohexanedimethanol in a molar ratio of 1:2 and 2 wt % of a thermal stabilizer including a phosphate as a base component were respectively put into a first extrusion unit and a second extrusion unit. A skin layer component including 60 wt % of polycarbonate, 38 wt % of PCTG prepared by polymerizing terephthalate with ethylglycol and cyclohexanedimethanol in a molar ratio of 1:2, and 2 wt % of a thermal stabilizer including a phosphate were put into a third extrusion unit.

An extruding temperature for the base component and the dispersed body component was 245° C., polymer flow was calibrated by adjusting an intrinsic viscosity (I.V.) using a capillary rheometer (Cap. Rheometer), and then passed through a fluid path equipped with a filtration mixer to induce random dispersion of dispersed bodies in the base, and then the skin layer component was laminated to both surfaces of the base layer component. Spreading of the polymer on coat-hanger dies shown in FIGS. 14 and 15 for correcting a flow rate and a pressure gradient was induced. In detail, a die inlet had a width of 200 mm and a thickness of 10 mm, and a die outlet had a width of 1,260 mm and a thickness of 2.5 mm, and the flow rate was 1.0 m/min. Afterward, cooling and planarization in a casting roll were performed, and the resultant product was elongated 6 times in an MD direction. Subsequently, heat-setting was performed using a heater chamber at 180° C. for 2 minutes, thereby manufacturing a random dispersion-type polarizer having a thickness of 120 μm (thickness including a skin layer: 300 μm), shown in Table 1. A refractive index of the PEN component of the manufactured reflective polarizer was (nX: 1.88, nY: 1.58, nZ: 1.58), and a refractive index of the base component including 60 wt % of polycarbonate, 38 wt % of PCTG prepared by polymerizing terephthalate with ethylglycol and cyclohexanedimethanol in a molar ratio of 1:2, and 2 wt % of a thermal stabilizer including a phosphate was 1.58. A core layer had a thickness of 120 μm, and each of the upper and lower skin layers had a thickness of 90 μm.

Afterward, the manufactured reflective polarizer was subjected to the process illustrated in FIG. 19, thereby manufacturing a reflective polarizer in which a urethane acryl-based prism pattern layer had a refractive index of 1.59. The reflective polarizer with a prism pattern was 20 μm in height, and 40 μm in pitch.

Examples 2 to 5 and Comparative Examples 1 and 2

A random dispersion-type reflective polarizer was manufactured according to the process described in Example 1, except the conditions, which are shown in Table 1.

Experimental Example

Physical properties of the reflective polarizers manufactured according to Examples 1 to 5 and Comparative Examples 1 to 2 are shown in Table 1.

1. Relative Luminance

To measure a luminance of the manufactured reflective polarizer, the following process was performed. A panel was assembled onto a 32" direct-type backlight unit including a diffusion plate and a reflective polarizer, and then luminance was measured at 9 points using TOPCON BM-7 to obtain a mean value.

Relative luminance is a relative value of luminance of another example or a comparative example, when the luminance of the reflective polarizer of Example 1 was 100 (basis).

2. Bright Line Visibility

Bright line visibility was evaluated after a panel was assembled onto a 32" direct-type backlight unit including a reflective polarizer, a diffusion plate, a diffusion sheet, a prism sheet, and a luminance-reinforced film. In detail, the evaluation on the bright line visibility was performed by observing a bright line with the naked eye, and when the number of bright lines was 0, it was evaluated as very good, when the number of bright lines was 1, it was evaluated as good, when the number of bright lines was 2 to 3, it was evaluated as moderate, and when the number of bright lines was 4 to 5, it was evaluated as failed.

TABLE 1

| | Example 1 | Example 2 | Example 3 | Example 4 | Example 5 | Comparative Example 1 | Comparative Example 2 |
|---|---|---|---|---|---|---|---|
| Aspect ratio | 95 | 95 | 95 | 90 | 82 | 73 | 93 |
| First group | 49 | 46 | 37 | 40 | 62 | 45 | 72 |
| Second group | 39 | 48 | 30 | 43 | 23 | 44 | 28 |
| Third group | 12 | 6 | 33 | 17 | 15 | 11 | 0 |
| 1/3 group | 4.1 | 7.7 | 1.2 | 2.4 | 4.1 | 4.5 | — |
| Relative luminance | 100 | 94 | 95 | 98 | 97 | 91 | 90 |
| Polarization degree | 81 | 78 | 78 | 80 | 79 | 78.5 | 73 |
| Bright line visibility | Very good | Good | Good | Moderate | Moderate | Failed | Failed |

In Table 1, the aspect ratio indicated the number of dispersed bodies having an aspect ratio of 1/2 or less among the total dispersed bodies by percentage (%), the first to third groups indicated the number of dispersed bodies satisfying the range of the cross-sectional areas of the first to third groups of the present invention among the dispersed bodies having an aspect ratio of 1/2 or less by percentage (%), and the 1/3 group indicated the number of the first groups/the number of the third groups by percentage (%).

As shown in Table 1, Examples 1 to 5 satisfying the scope of the present invention are excellent in luminance, polarization degree and bright line visibility, compared with Comparative Examples 1 and 2. Meanwhile, Example 1 satisfying the range of the 1/3 group of the present invention exhibited a better optical property than Examples 2 to 4, which did not satisfy it. Furthermore, compared with Example 5 which is outside a content range of the first group, the optical property of Example 1 was very excellent.

INDUSTRIAL APPLICABILITY

A reflective polarizer of the present invention has excellent light modulation performance, and therefore can be widely used in fields required for light modulation. In detail, the reflective polarizer can be widely used in flat panel display technology including a high luminance-required LCD such as a mobile display, an LCD, or an LED, a projection display, a plasma display, a field emission display and an electroluminescent display.

The invention claimed is:

1. A random dispersion-type reflective polarizer, comprising:
a core layer, which, to transmit first polarized light and reflect second polarized light of light incident upon the core layer, includes a plurality of dispersed bodies in a base, the plurality of dispersed bodies and the base having a different refractive index along at least one axis direction, and the plurality of dispersed bodies having a major axis and a minor axis based on a vertical cross-section taken of the plurality of dispersed bodies, 80% or more of the plurality of dispersed bodies having an aspect ratio, indicating a ratio of a length of the minor axis to a length of the major axis, based on a vertical cross-section in the lengthwise direction of 1/2 or less, where the dispersed bodies having an aspect ratio of 1/2 or less are divided into three or more groups having different cross-sectional areas, the cross-sectional area of the first group is 0.2 to 2.0 μm², the cross-sectional area of the second group is more than 2.0 to 5.0 μm², and the cross-sectional area of the third group is more than 5.0 to 10.0 μm², and the first to third groups of dispersed bodies are randomly aligned.

2. The reflective polarizer of claim 1, wherein, among the dispersed bodies having an aspect ratio of 1/2 or less, the number of dispersed bodies of the third group is 10% or more.

3. The reflective polarizer of claim 1, wherein, among the dispersed bodies having an aspect ratio of 1/2 or less, the number of dispersed bodies of the first group is 30 to 50%, and the number of dispersed bodies of the third group is 10 to 30%.

4. The reflective polarizer of claim 1, wherein, among the dispersed bodies having an aspect ratio of 1/2 or less, the number of the dispersed bodies of the first group divided by the number of the dispersed bodies of the third group is 3 to 5.

5. The reflective polarizer of claim 1, wherein the base and the dispersed body have a difference in refractive index of 0.05 or less with respect to two axis directions of any three mutually perpendicular axis directions, and 0.1 or more with respect to the remaining axis direction.

6. The reflective polarizer of claim 1, wherein the reflective polarizer is elongated in at least one axis direction.

7. The reflective polarizer of claim 1, further comprising:
a skin layer formed on at least one surface of the core layer.

8. The reflective polarizer of claim 1, further comprising:
a structured surface layer formed on at least one surface of the core layer.

9. The reflective polarizer of claim 8, further comprising:
a primer layer for reinforcing an adhesive strength, which is formed between the core layer and the structured surface layer.

10. The reflective polarizer of claim 9, wherein the structured surface layer is a micropattern layer.

11. The reflective polarizer of claim 10, wherein the micropattern is one or more selected from the group consisting of a prism pattern, a lenticular pattern, a microlens pattern, a triangular pyramid pattern, and a pyramid pattern.

12. The reflective polarizer of claim 8, wherein the structured surface layer is a micropattern layer.

* * * * *